United States Patent [19]
Newman et al.

[11] Patent Number: 5,432,906
[45] Date of Patent: Jul. 11, 1995

[54] COLOR IMAGE PROCESSING SYSTEM FOR PREPARING A COMPOSITE IMAGE TRANSFORMATION MODULE FOR PERFORMING A PLURALITY OF SELECTED IMAGE TRANSFORMATIONS

[75] Inventors: Gary H. Newman, Concord, Mass.; Christopher J. Enscoe, Earleville, N.Y.; Robert F. Poe, Charlestown, Mass.; H. Scott Gregory, Jr., Bedford, Mass.; Michael S. Schwartz, Arlington, Mass.

[73] Assignee: Eastman Kodak Company, Rochester, N.Y.

[21] Appl. No.: 253,827

[22] Filed: Jun. 3, 1994

Related U.S. Application Data

[60] Continuation of Ser. No. 179,828, Dec. 22, 1993, abandoned, which is a continuation of Ser. No. 58,082, May 4, 1993, abandoned, which is a division of Ser. No. 832,358, Feb. 7, 1992, Pat. No. 5,208,911, which is a division of Ser. No. 717,099, Jun. 18, 1991, abandoned, which is a continuation of Ser. No. 590,375, Sep. 28, 1990, abandoned.

[51] Int. Cl.⁶ .............................................. G06F 15/00
[52] U.S. Cl. ...................................... 395/162; 382/302
[58] Field of Search ................................. 395/162, 164–166, 395/155, 131, 375, 132, 275; 382/41, 49; 358/523, 530; 345/147, 150, 153, 154, 185, 199

[56] References Cited

U.S. PATENT DOCUMENTS

| | | | |
|---|---|---|---|
| 4,477,833 | 10/1984 | Clark et al. | 358/525 |
| 4,488,245 | 12/1984 | Dalke et al. | 364/526 |
| 4,496,968 | 1/1985 | Pugsley | 358/531 |
| 4,500,919 | 2/1985 | Schreiber | 358/518 |
| 4,736,244 | 4/1988 | Shiota et al. | 358/506 |
| 4,805,226 | 2/1989 | Guebey | 382/27 |
| 4,850,027 | 7/1989 | Kimmel | 382/49 |
| 4,901,258 | 2/1990 | Akiyama | 364/577 |
| 4,941,039 | 7/1990 | E'Errico | 358/518 |
| 4,958,220 | 9/1990 | Alessi et al. | 358/527 |
| 4,965,844 | 10/1990 | Oka et al. | 382/44 |

OTHER PUBLICATIONS

Hunt, "Measuring Colour," Ellis Horwood Limited, 1987, Chapter 3, pp. 53–73.
Fundamentals of Interactive Computer Graphics, Foley et al, Addison–Wesley Publishing Co., Reading Mass., Mar. 1983, pp. 245–266.
Color Magic from Kodak by Electronic Printing Systems, Apr. 1989.

*Primary Examiner*—Mark R. Powell
*Assistant Examiner*—Kee M. Tung
*Attorney, Agent, or Firm*—Raymond L. Owens

[57] ABSTRACT

A method and apparatus for generating a modified electronic image combines multiple image transforms into a single composite transform, and then modifies the electronic image in accordance with the composite transform. The composite transform includes sample values sequentially modified in accordance with each of the multiple image transforms being combined. The method and apparatus further provides a user interface allowing a user to select individual transforms for composition. The use of a composite transforms allows a user to interact with the image processing system more quickly and interactively while obtaining a desired modified image.

42 Claims, 17 Drawing Sheets

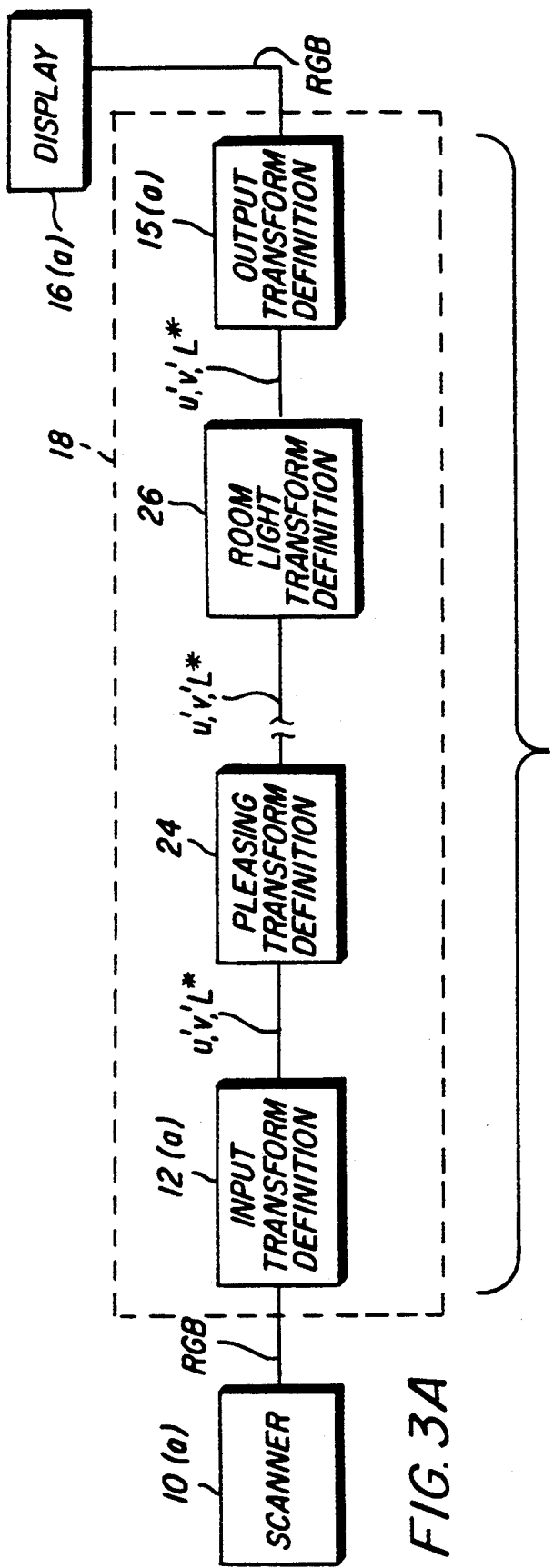
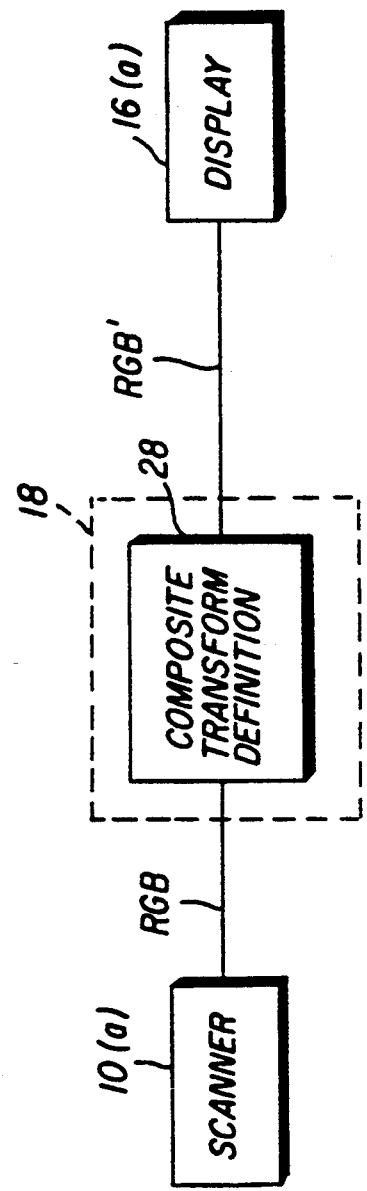

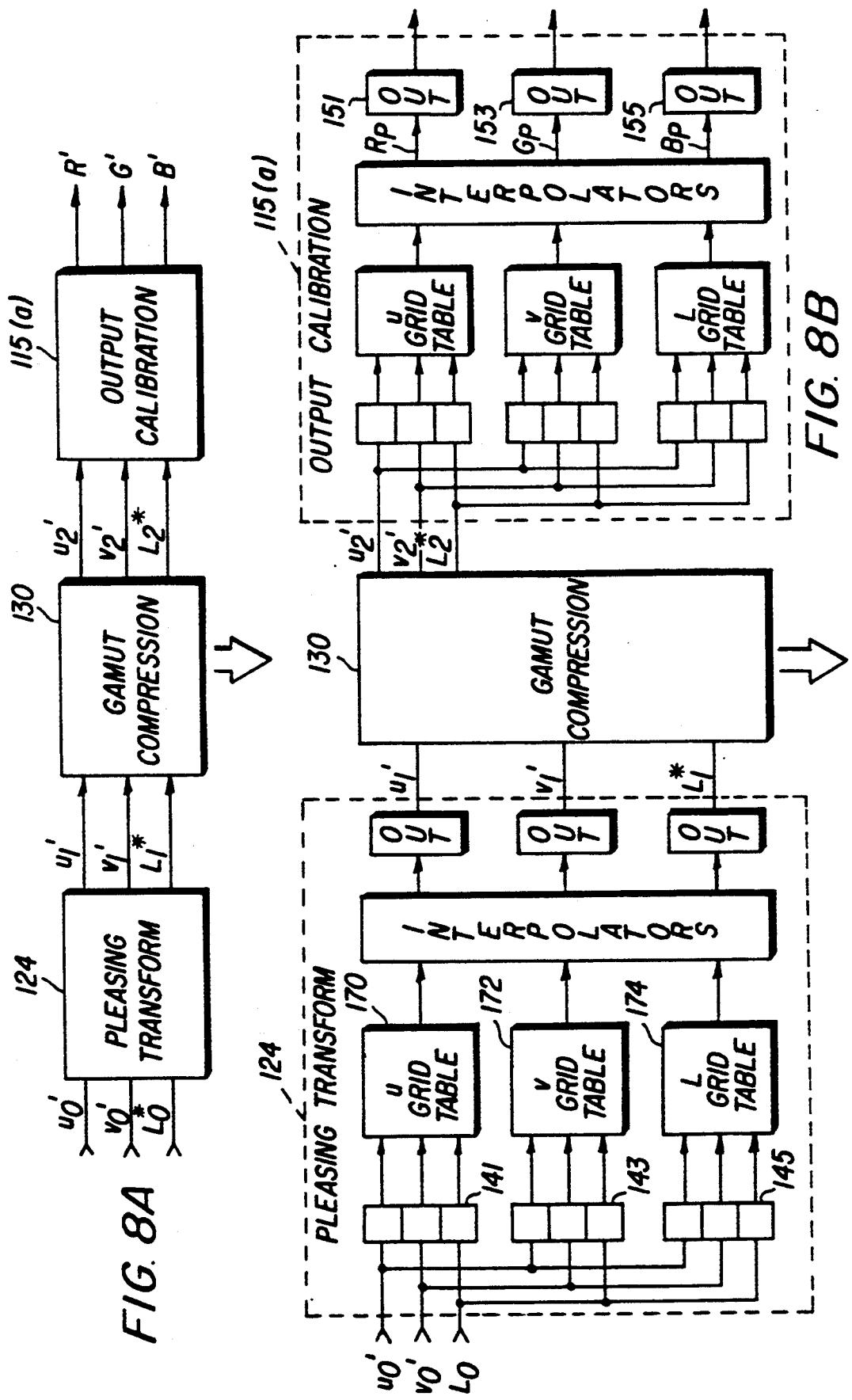

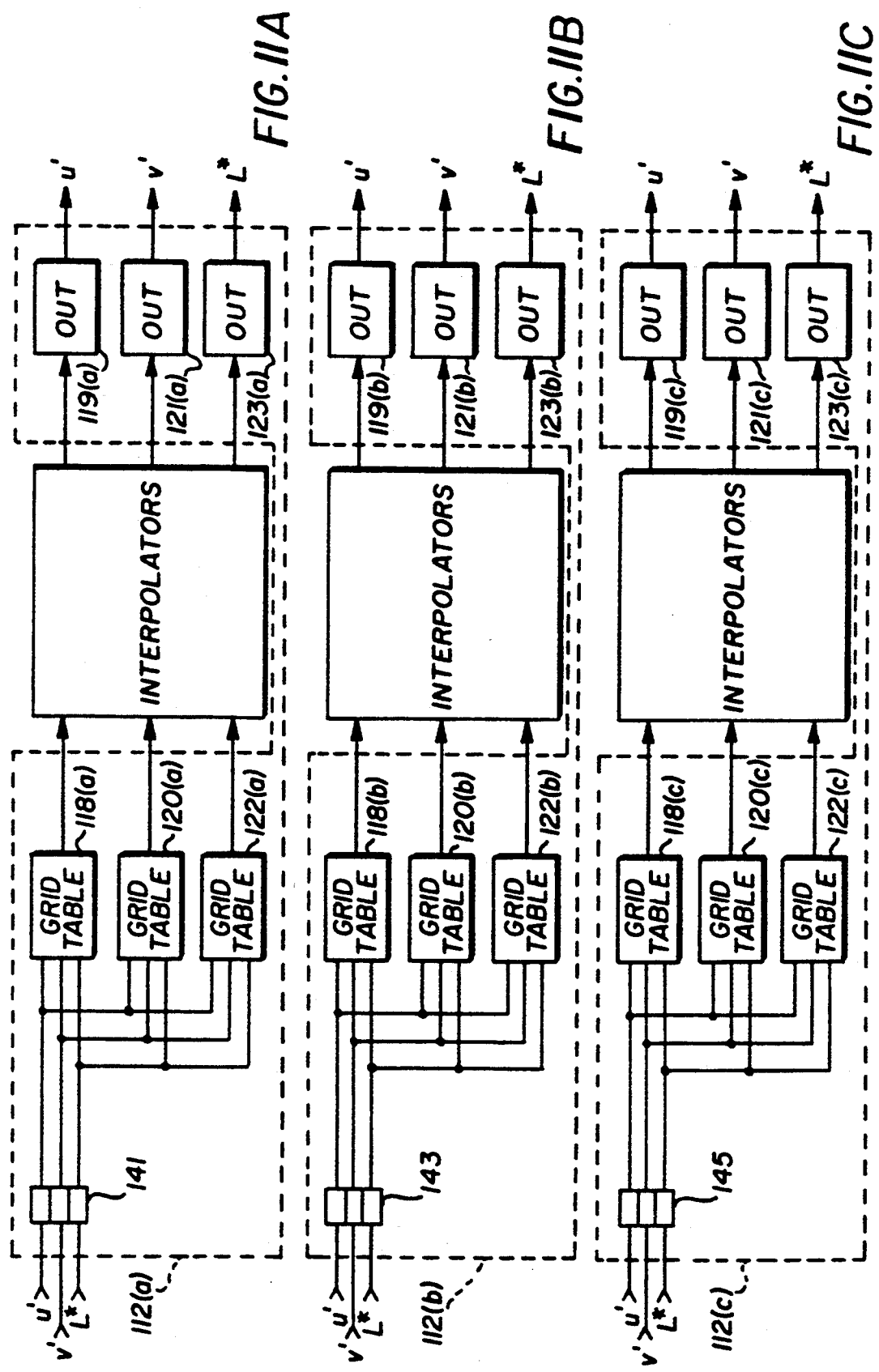

COLOR IMAGE PROCESSING SYSTEM FOR PREPARING A COMPOSITE IMAGE TRANSFORMATION MODULE FOR PERFORMING A PLURALITY OF SELECTED IMAGE TRANSFORMATIONS

CROSS-REFERENCE TO RELATED APPLICATIONS

This application is a continuation of U.S. Ser. No. 08/179,828 filed Dec. 22, 1993, now abandoned, which was a continuation of U.S. Ser. No. 08/058,082, filed May 4, 1993 (now abandoned). This is a division of application Ser. No. 07/832,358, filed 07 Feb. 1992 (now U.S. Pat. No. 5,208,911), which is a divisional of 07/717,099, filed 18 Jun. 1991, now abandoned, which in turn is a continuation of 07/590,375, filed on 28 Sep. 1990, now abandoned.

BACKGROUND OF THE INVENTION

The invention relates generally to color image processing systems, and in particular to color image processing systems employing look-up tables for transforming from a first coordinate space to a second coordinate space.

Color image processing systems typically include an input device for generating an electronic representation of a color image. The input device provides the electronic image representation to a computer workstation which processes the image in accordance with a user's instructions and forwards the processed image to a high resolution color monitor for display. The user interacts with the workstation, repeatedly instructing it to adjust the electronic image until the monitor displays a desired image. The user can also generate a hard copy of the image by instructing the workstation to provide the processed electronic image to a selected printing device.

The electronic image processed by the workstation consists of a two dimensional array of picture elements (pixels). The color of each pixel may be represented in any of a variety of color notations or "color spaces." For example, the RGB color space represents pixel colors according to the relative contributions of three primary colors, red, green and blue. This color notation is commonly used by color monitors since the three parameters (R, G, B) correspond to the mechanism by which the monitor generates color. More specifically, each pixel of the monitor's display contains three primary color phosphors. To generate a color defined by a set of RGB values, the monitor stimulates each primary phosphor with an intensity determined by the corresponding R, G, B value.

Similarly, the CMYK color space represents color using four variables, C, M, Y, K, each corresponding to the relative (subtractive) contribution of the colorants, cyan, magenta, yellow and black. This notation is commonly used by printing devices since each parameter C,M,Y and K determines the amount of a colorant (e.g. ink, dye) used by the printer in producing a desired color.

Color spaces such as linear RGB and CMYK are useful for image scanning devices and image printing devices, respectively, since each parameter of the color space closely corresponds to a physical mechanism by which these devices measure and generate color. However, for a variety of reasons, these color spaces may not be well suited for processing color images. For example, as shown in FIG. 1, the three parameters R, G, B define a three dimensional, linear color space, each point within the space corresponding to a unique color. At various points within the space, a selected change in the values of the parameters may not result in a commensurate change in the perceived color. For example, at one location in the space, increasing the parameter R by n units yields little perceived change in color. Yet, at another point in the space, increasing R by the same n units yields a dramatic change in the perceived color. Accordingly, it may be difficult for a user to manipulate the primaries R, G, B, to achieve a desired change in color.

In response to this problem, a variety of perceptually based color spaces have been proposed for defining color in terms of parameters which more closely correspond to the manner in which humans perceive color. The most prominent perceptually based standards for color representation are collectively referred to as the CIE system promulgated by the International Commission on Illumination.

The "u'v'L*" space, for example, is a three dimensional color space defined by the parameters u', v', L*. The chromaticity of each color in this space is uniformly characterized by the parameters u', v'. The third parameter, L*, denotes perceptually uniform variations in the lightness of the color, (e.g., $L^*=0$ is black, $L^*=100$ is white).

To process a color image in the "u'v'L*" color space, the workstation simply maps each point $u'_0$, $v'_0$, $L^*_0$ in the color space to a new point $u'_1$, $v'_1$, $L^*_1$. For example, if the user desires to display the image on a monitor, he may wish to adjust the colors of the image to compensate for lighting conditions of the room. Accordingly, the user selects a transform which maps each point $u'_0$, $v'_0$, $L^*_0$ to a new point having the same values $u'_0$, $v'_0$ but having greater luminance value $L^*_1$.

The image processing system typically contains a predetermined transform definition for each such color image transformation. Based on a selected definition, the system maps certain points of the color space to new points. Accordingly, the color at each pixel of an electronic image is sequentially mapped in accordance with the transform definition to yield the desired visual effect. To perform another image transformation, the system remaps the color values to yet another point in accordance with a second transform definition. Any number of transformations can thus be performed by sequentially mapping color values according to the available predetermined transform definitions. However, such sequential processing of images can be extremely time consuming, particularly if a large number of predetermined transforms are selected.

Therefore, one object of the present invention is to enable the user of an image processing system to dynamically create a single transform definition embodying a plurality of selected image transformations. A further object of the present invention is to build such a composite transform definition using the plurality of predetermined transform definitions. Yet a further object of the invention is to provide a new format definition for the transformation for easily defining the color processing requirements between hardware systems.

SUMMARY OF THE INVENTION

The invention relates to a method and apparatus for generating an array of modified pixel values in response to an array of input pixel values.

The method features-the steps of receiving a user's selection of an image transformation to be performed on the array of input pixel values. In response to the user's selections, a plurality of transform definitions are automatically selected from stored transform definitions. Each transform definition includes sample values representing an input/output relation of a predetermined image transformation. From these selected transform definitions, a composite transform definition is generated containing sample values of an input/output relation of a composite image transformation which is equivalent to the several image transformations effectively selected by the user. The composite transform is preferably compiled and implemented sufficiently quickly (e.g., in real time) to allow the user interactively change his selections until a desired composite transformation is created.

Preferred aspects of the invention include the step of generating the composite transform definition by preparing at least one multidimensional grid table containing the sample values of the composite transform definition. Further, at least one input table is prepared containing, for each input color value, a grid table address of a corresponding entry of the grid table. The input table additionally contains, for each input color value, at least one distance value. Finally, at least one output table is prepared, specifying for each processed color value, a corresponding modified color value.

To prepare a multidimensional composite grid table, the selected transform definitions are ordered in a specified sequence such that the pixel values generated by each transform are in the color space and have the quantization required by the next transform in the sequence. A plurality of representative values are then selected and sequentially processed according to the specified sequence of transform definitions.

To implement a composite transform definition, at least one sample value is selected from the composite transform definition, based on the value of an input color to be modified. A processed color value is then determined based on the at least one selected sample value. For example, in one embodiment, a nearest neighbor of the input color value is selected as the sample value. In another embodiment, a plurality of sample values are selected and the processed color value is determined by interpolating between these values.

In another aspect of the invention, the stored transform definitions may include predetermined transform definitions and custom transform definitions made in accordance with a user's instruction. A user's instructions specifying desired color changes are received. A custom transform definition is then prepared for implementing the selected color changes. Such custom transforms may be created by modifying predetermined transforms or be generating entirely new transforms based on the user's input.

Other objects, features and advantages of the invention are apparent from the following description of particular preferred embodiments taken together with the drawings.

BRIEF DESCRIPTION OF THE DRAWINGS

FIG. 3(a) is a flow chart illustrating the implementation of a sequence of predetermined transform definitions.

FIG. 3(b) is a flow chart illustrating the implementation of a composite transform definition.

FIGS. 8(a) and 8(b) are diagrams illustrating the implementation of a sequence of transform definitions.

FIGS. 11(a), 11(b) and 11(c) are block diagrams of a set of identity transform definitions and a processor for implementing them.

DESCRIPTION OF THE PREFERRED EMBODIMENTS

Figure 1:
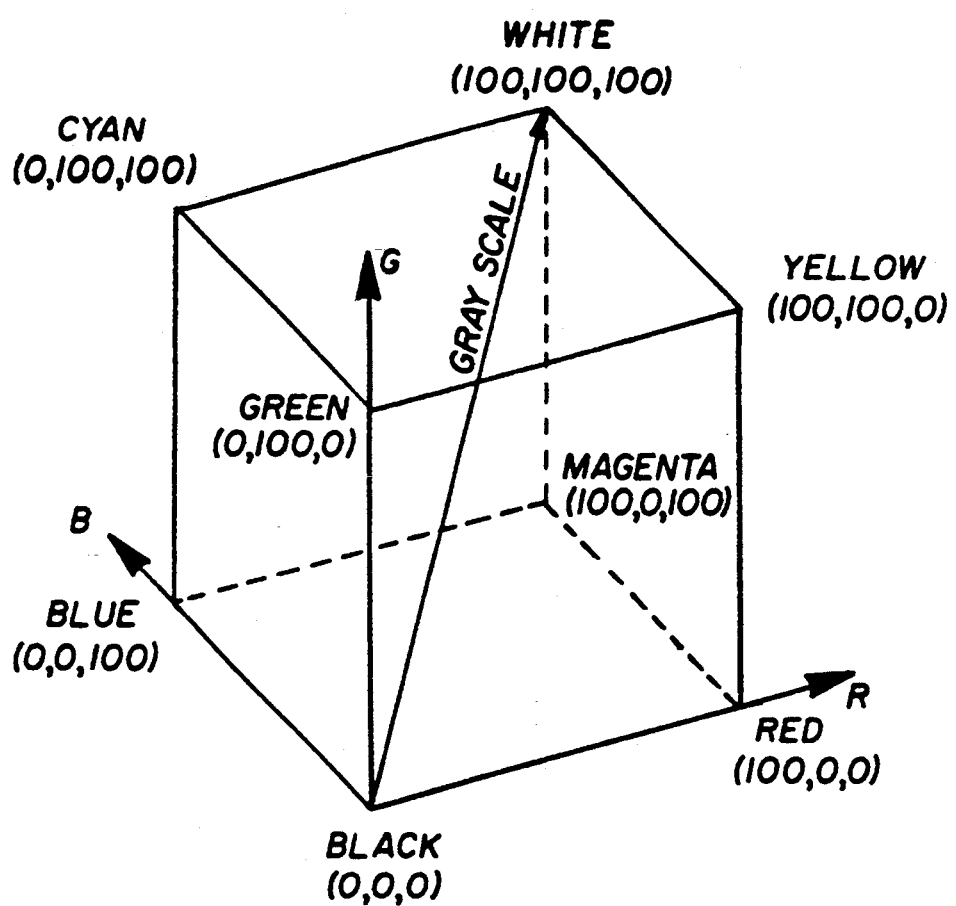
FIG. 1 is a diagram of the RGB color space.
Figure 2:
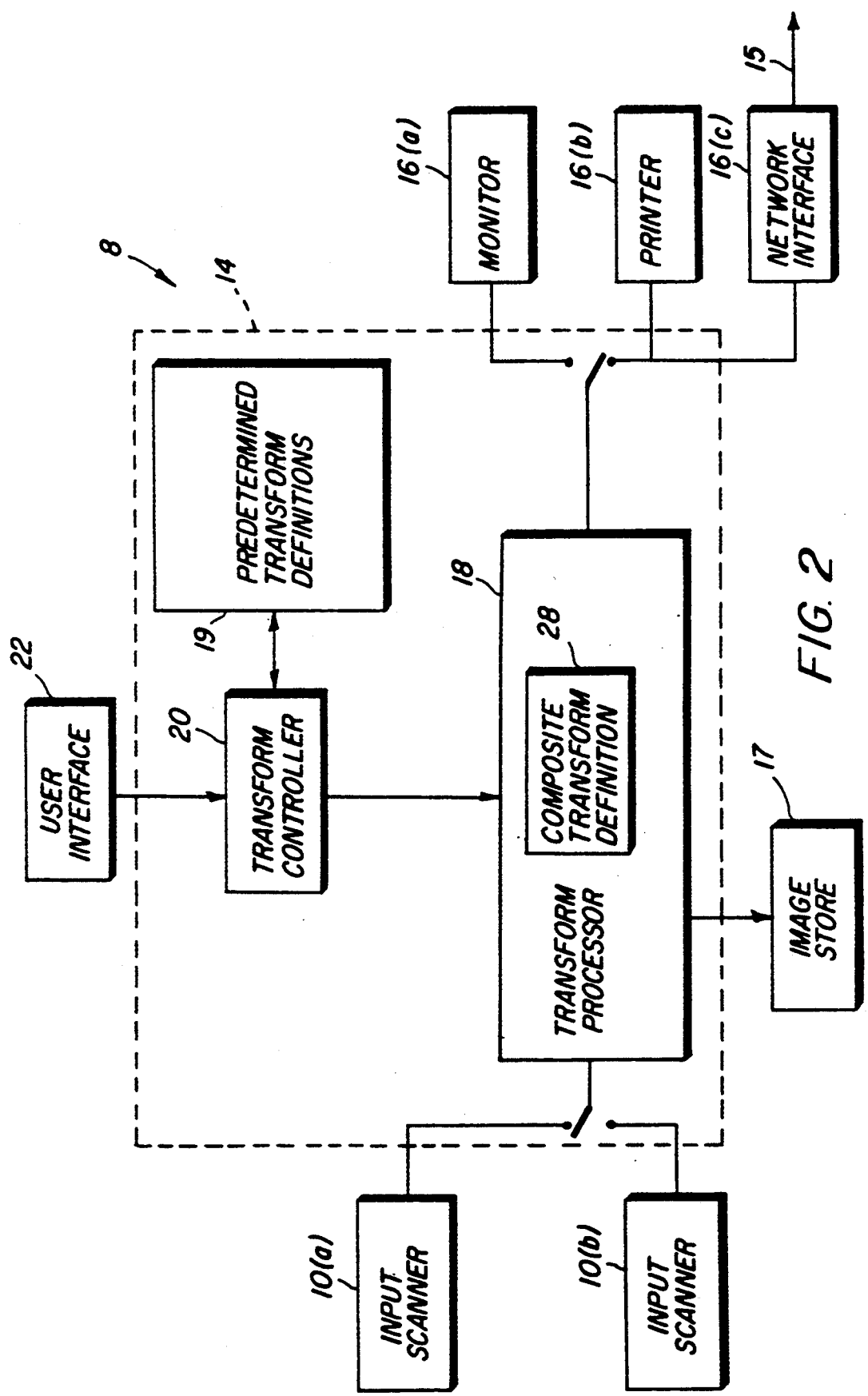
FIG. 2 is a block diagram of an image processing system in accordance with the claimed invention.

Referring to FIG. 2, an image processing system 8 includes a plurality of input devices 10 for scanning a source image (such as a photograph, film, or a scene within the view of a camera) to create an electronic digital representation of the image. The electronic representation is provided to an image processor 14 which adjusts the colors of the electronic image and either stores the adjusted image on storage device 17 (e.g., for later retrieval and processing) or forwards it to various output devices 16 for printing, display or transmission over a network 15 or any other communication channel.

Image processor 14 is connected to a user interface 22 through which a user indicates the desired transformations to be performed on an electronic image. In general, image processor 14 and user interface 22 are implemented with a properly programmed general purpose computer or computer workstation.

In response to the user's request, in one mode of operation, a transform controller 20 selects a set of transform definitions from a collection 19 of stored predetermined transform definitions. Each predetermined transform definition describes a unique transform for mapping the values representing each color of an image in a first color space to a different set of values (e.g., a different color in a different color space) thus yielding a desired image transformation. The user can also create his own custom transform definition in accordance with the invention. For example, the user interface allows the user to select a set of colors to be changed (e.g., from a palate of possible colors). The user can then specify the desired changes to these colors, (e.g., a specific increase in the brightness). In response to these selections, the controller can then prepare a custom transform definition corresponding to the user's selections. Such custom transforms may be created by modifying predetermined transforms or by generating entirely new transforms based on the user's input.

In accordance with the user's instructions, controller 20 can compose the selected transform definitions into a single composite transform definition 28 as illustrated in FIGS. 3a, 3b for processing and displaying (or printing) the image from the input device without intermediate storage of the image. This selection and composition is performed with sufficient speed to allow the user to interact with the system, altering his selections until the system displays a desired image.

Figure 4:
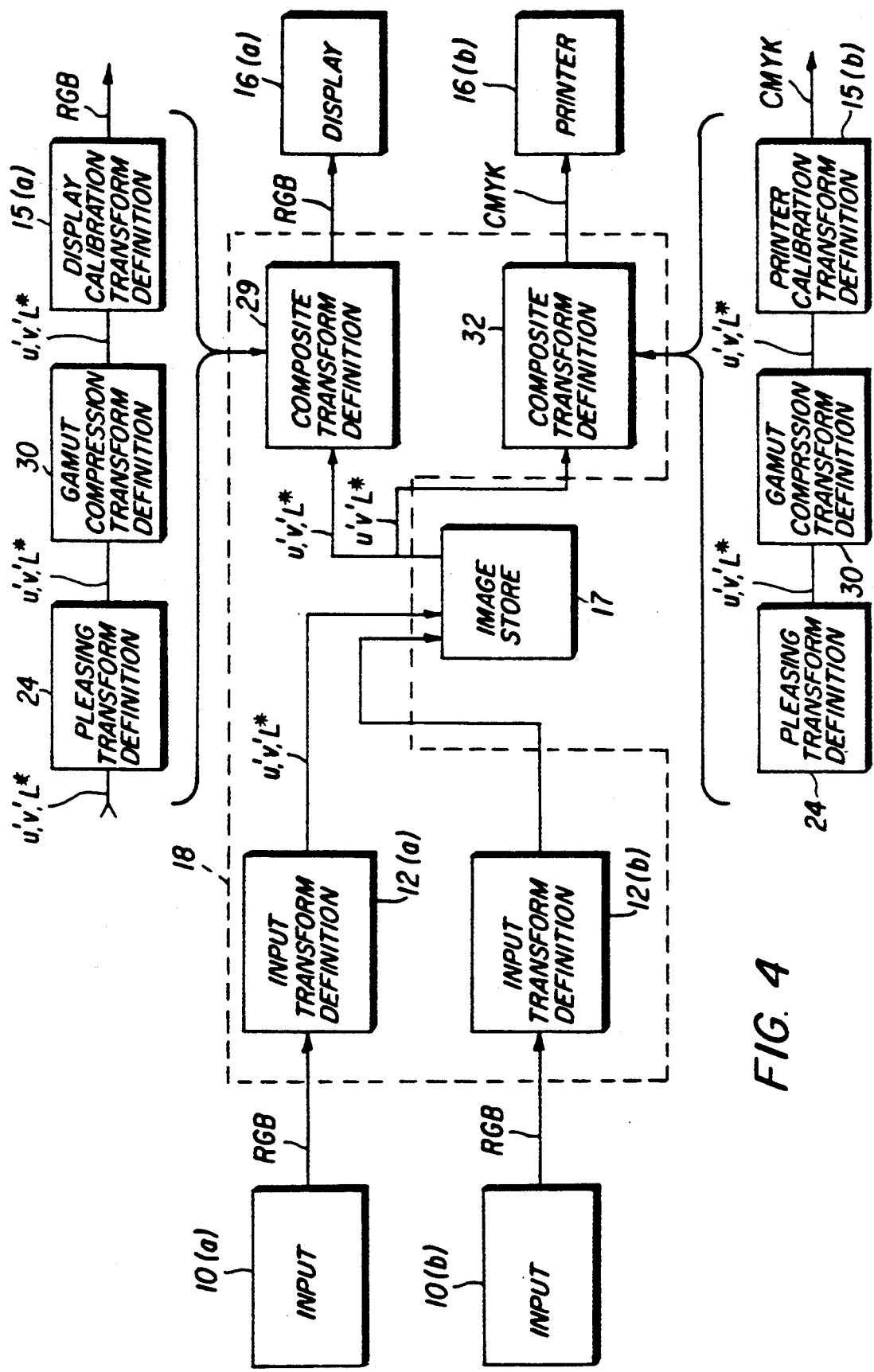
FIG. 4 is a block diagram of a sequence of transform operations.

Alternatively, as shown in FIG. 4, controller 20 (FIG. 2) can process an image in accordance with an input transform definition and store the processed image on storage device 17. Controller 20 (FIG. 2) can then compose the remaining selected transform definitions for processing the stored image at a later time.

Referring again to FIG. 2, controller 20 provides the composite transform definition 28 to transform processor 18 which implements the transform in accordance with the composite transform definition 28. Transform processor 18 may be implemented in software on a general purpose computer, performing any transform specified in a given transform definition.

Referring to FIGS. 3(a), 3(b), the user, for example, may instruct image processor 14 to accept an electronic image from scanner 10(a), perform selected transformations of the image, and display the transformed image on color monitor 16(a). In response, controller 20 first (and preferably automatically) selects input transform definition 12(a) for converting the electronic image from scanner 10(a) into a "reference" color space used in performing subsequent transformations. More specifically, the defined input transform maps each point in the scanner's RGB space to a corresponding point in the perceptually based color space, u', v', L* (i.e., the "reference" space). In performing this translation, the input transform compensates for idiosyncrasies of the associated scanner 10(a). For example, in response to a given color, each scanner 10(a), 10(b) may generate different coordinates in the RGB space. Accordingly, the input transform definitions 12(a), 12(b) (see FIG. 4) are calibrated to compensate for idiosyncrasies of each scanner such that each scanner generates the same point in the reference space u'v'L* when scanning a given color.

After selecting input transform definition 12(a), controller 20 next selects transform definitions 24 and 26 corresponding to the color transformations requested by the user. Pleasing transform definition 24, for example, increases the luminance parameter L of certain blue colors in the image. Room light transform definition 26 adjusts all colors to compensate for the ambient lighting conditions surrounding display 16(a).

Controller 20 finally selects (again automatically in the illustrated embodiment) output transform definition 15(a) to convert the thus processed image from the reference color space to the RGB color space required by color monitor 16(a).

As shown in FIG. 3(a), the selected transformations could be performed sequentially by processing the image with each transform definition in the sequence. However, to expedite processing according to the invention, controller 20 dynamically composes the four transform definitions 12(a), 24, 26 and 15(a) into the composite transform definition 28. The electronic image from scanner 10(a) is then processed in a single transformation step in accordance with composite transform definition 28 and thereafter is displayed on color monitor 16(a).

Referring to FIG. 4, the user may alternatively request that the image from scanner 10(a), after calibration and with or without further "input" processing, be stored on storage device 17 before being further processed and displayed. Accordingly, controller 20 (FIG. 2) instructs transform processor 18 to process the electronic image according to input transform definition 12(a) and store the resultant calibrated image in a storage device 17.

At a later time, the user instructs controller 20 (FIG. 2) to modify the image with a "pleasing" transform and display the modified image on monitor 16(a) as it would appear if printed on printer 16(b). Accordingly, controller 20 (FIG. 2) automatically selects three transform definitions 24, 30, and 15(a) required to implement the task. Pleasing transform definition 24 is designed to adjust the colors to make them more pleasing (e.g., enhance certain blue colors). Gamut compression transform definition 30 is designed to modify the image so that it will appear the same on monitor 16(a) as if printed on printer 16(b). For example, if the electronic image contains colors which the printer cannot display, the gamut compression transform maps these colors to similar colors within the printer's gamut. Finally, display calibration transform definition 15(a) is designed to convert the image into the RGB color space required by monitor 16(a), calibrating the image to compensate for the characteristics of the monitor.

Controller 20 (FIG. 2) composes the three selected transform definitions into a single composite transform definition 29. It then fetches the previously stored image from storage 17 and instructs processor 18 to process the image according to composite transform definition 29 for display on monitor 16(a).

The user, satisfied with the displayed image, next instructs the controller to generate a hard copy of the image on printer 16(b). Accordingly, the controller selects the three transform definitions 24, 30, 15(b). The first two of the three definitions, pleasing transform definition 24 and gamut compression definition 30, are identical to the pleasing and gamut transform definitions used in generating the display image above. Printer calibration transform definition 15(b) however, is designed to convert the image into the CMYK color space, calibrating the image to compensate for characteristics of printer 16(b).

The controller 20 (FIG. 2) composes the selected transform definitions into a composite transform definition 32. The stored image (in u'v'L* color space) is then processed in accordance with composite transform definition 32 for printing (in the CMYK color space) by printer 16(b).

The contents of a transform definition and a means for implementing that definition are illustrated by the following description of a transform for mapping color values of an image in u'v'L* color space to modified color values in the same u'v'L* color space. It will be apparent to those skilled in the art that the same techniques can be used to prepare and implement transform definitions for translating from one color space to another color space (e.g., converting color values in the u'v'L* color space to color values in the CMYK color space).

Figure 7A:
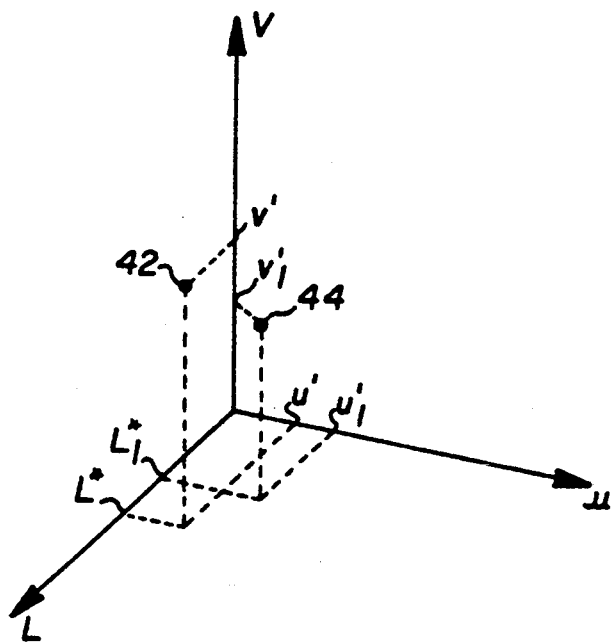
FIG. 7(a) is a diagram illustrating the mapping of a first point in u'v'L* space to a new point in the same space.

Referring to FIG. 7(a), the coordinates u', v', L* identify the color of a single pixel of the image to be transformed, corresponding, for example, to point 42 in the reference color space. To process this color value, transform processor 18 maps point 42, in accordance with a selected transform definition, to a new point 44 having the coordinates $u'_1$, $v'_1$, $L^*_1$. In the same manner, the color coordinates u', v', L* for each pixel of the input image are sequentially applied to transform processor 18 and are mapped to corresponding new points in the reference color space.

Figure 7B:
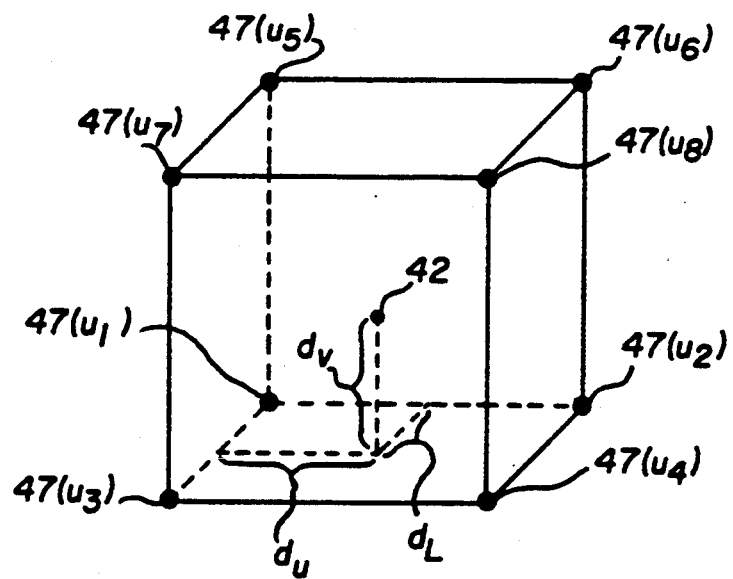
FIG. 7(b) is a diagram of a set of reference points in the u'v'L* color space.

In the preferred embodiment of the invention, each coordinate of a point in the reference color space is represented by an eight bit value. Accordingly, the three coordinates u', v', L* can identify $2^{24}$ points in the color space. Since storing a unique mapped transform output value for each of the $2^{24}$ points requires a prohibitively large memory, each transform definition (e.g., transform definitions 28, 29 and 32 of FIGS. 3, 4) instead stores a set of sample values. For example, FIG. 7(b) illustrates eight points $47(u_1-u_8)$ in the uvL space for which sample values are stored. The coordinates for which a sample value is stored define a point in the color space herein referred to as a "reference point."

A variety of techniques may be used for approximating the mapped transform output value of a point 44 from one or more sample values. For example, according to a simple technique, transform processor 18 fetches from the transform definition the sample value for the reference point $47(u_i)$ which is nearest the input point 42 and uses it as the point 44. (This is called a "nearest neighbor" approximation.) More sophisticated techniques call for fetching a plurality of sample values corresponding to the plurality of reference points $47(u_i)$ surrounding input point 42. The transform output value of point 44 is then estimated by interpolating between these fetched values.

For example, referring to FIG. 7(b), to transform a given input color value 42, transform processor 18 fetches the stored sample values for each of the eight reference points $47(u_1-u_8)$ which surround point 42 in the color space. By interpolating between these eight sample values, transform processor 18 computes a color value which approximates the operation of the transform on the input color value 42. As will be explained in more detail below, some transform definitions require an additional mapping of this color value to determine the final transform output color value (i.e., the color value having the coordinates of point 44).

Figure 5:
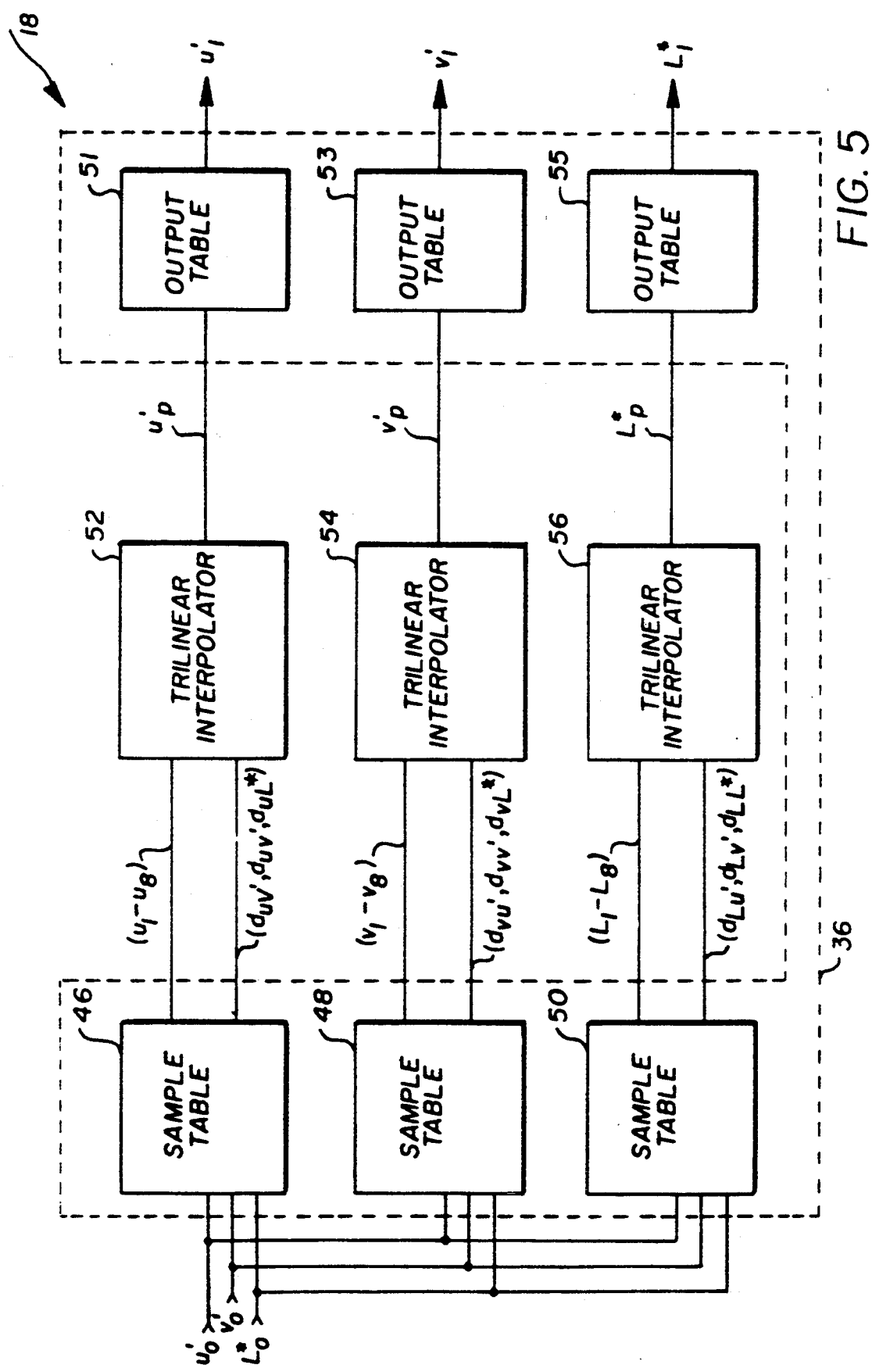
FIG. 5 is a block diagram of a transform processor.

Referring to FIG. 5, transform definition 36 is defined in part by the sample values stored in a collection of sample look-up tables 46, 48, 50. Table 46, for example, contains the sample value "$u_s$'" for each reference point $47(u_i)$. In response to the u', v', L* coordinates of point 42, sample table 46 locates the sample value "$u_s$'" for each surrounding reference point $47(u_1-u_8)$ (see FIG. 7(b)). In addition, sample look-up table 46 determines the distance values $d_{uu'}$, $d_{uv'}$, $d_{uL*}$, which represent the position of point 42 relative to the corner reference point $47(u_i)$. Each of the eight sample values, $u_{s1}-u_{s8}$, is provided to a trilinear interpolator 52 along with the distance values $d_{uu'}$, $d_{uv'}$, $d_{uL*}$. Trilinear interpolator 52 interpolates, as is well known in the field, between the eight sample values based on the distances $d_{uu'}$, $d_{uv'}$, $d_{uL*}$, to derive the processed value $u'_p$. Output table 51, also from transform definition 36, completes the transform by mapping the processed value $u'_p$ to the modified value $u_1'$, corresponding to point 44.

Sample table 46, trilinear interpolator 52, and output table 51 comprise one channel of the transform processor 18. Transform processor 18 contains a different channel for computing each parameter of the transform processor's output. Accordingly, a second channel (comprising sample table 48, interpolator 54, and output table 53) computes the value $v'_1$ and a third channel (comprising sample table 50, interpolator 56 and output table 55) computes the value $L^*_1$. As another example, if transform processor 18 is provided with transform definition 15(b) for converting from u'v'L* space to CMYK space (see FIG. 4), four channels are required, each channel for computing one of the four output variables C, M, Y, K. As another example, if transform processor 18 is provided with a transform definition for converting CMYK data to RGB data, three channels are required, each for computing one of the three output variables R,G,B. Each channel, in this example, preferably has a four dimensional grid table, one dimension for each input variable, C,M,Y,K. In this example, quadrilinear interpolation is preferably used to interpolate between sample values at selected reference points in the four dimensional CMYK space.

In populating the sample tables, it is critical to carefully choose the coordinates of the reference points at which sample values of the transform are precomputed. For example, a given image transform may vary linearly in a certain region of the color space. In the case where the transform definition uses linear interpolation to estimate between points, very few sample values may be sufficient to describe the mapping of all colors in this region. However, in other regions of the color space, the image transform may vary in a non-linear manner. In such regions, a large number of sample values are required to accurately represent the transformation of all pixels (if linear interpolation of samples values is the chosen approximation technique). To provide such a non-uniform distribution of reference points throughout the reference space, each sample table employs a collection of one-dimensional input tables for applying a non-linear transformation to the input variable to enable a non-uniform distribution reference points in the multidimensional transform definition.

Figure 6:
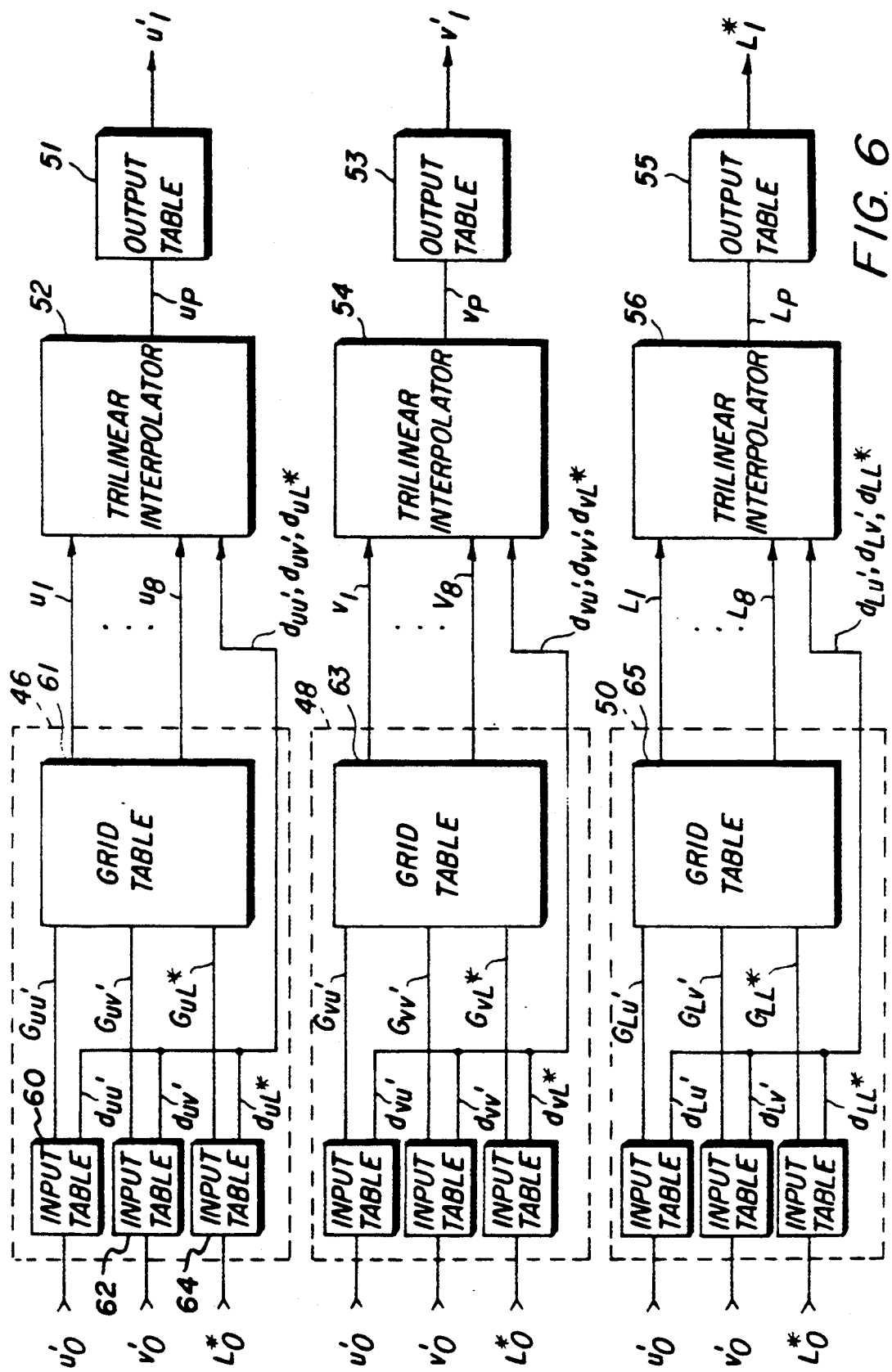
FIG. 6 is a more detailed block diagram of a single channel of a transform processor.

Referring to FIGS. 6 and 7(b), for example, the sample values of sample tables 46, 48, 50 are stored in a grid tables 61, 63, 65 respectively. Upon receipt of the coordinates $u'_o$, $v'_o$, $L_o^*$ of an input color value, input tables 60, 62, 64 of the first channel provide the coordinates $G_{uu'}$, $G_{uv'}$, $G_{uL*}$ (6 bits each) to select the entry in grid table 61 containing the sample value for the corner reference point $47(u_1)$. By selectively incrementing each coordinate $G_{uu'}$, $G_{uv'}$, $G_{uL*}$, by one, grid table 61 provides trilinear interpolator 52 with the sample values of each of the other surrounding points $47(u_2-u_8)$ (12 bit values).

Input tables 60, 62, 64 further provide the distance values $d_{uu'}$, $d_{uv'}$, $d_{uL*}$ (12 bits each) to trilinear interpolator 52. More specifically, input table 60 provides the distance $d_{uu'}$ representing the distance of input color value (e.g. point 42) from the point $47(u_1)$ as a fraction of the total distance in the u' axis direction between points 47($u_1$) and 47($u_2$) (see FIG. 7(b)). Similarly, input tables 62, 64 provide the distances duv', duL* representing the fractional distances of the input color value (point 42) from the corner reference points along the v' and L* axes respectively.

Trilinear interpolator 52 then computes the weighted average of the eight sample values based on the distances values $d_{uu'}$, $d_{uv'}$, $d_{uL*}$, to provide a twelve bit processed value $u_p$. More specifically, trilinear interpolator evaluates the following functions.

$$u_p = L\ (B(u_1, u_2, u_3, u_4, d_u, d_L), B(u_5, u_6, u_7, u_8, d_u, d_L), d_v)$$

where the operator "L" represents linear interpolation between two values according to the equation L(a,b,I)=I (b)+(1−I) a; and where the operator "B" represents bilinear interpolation between four values according to the equation:

$$B(c, d, e, f, I_{cd}, I_{ef}) = L(L(c, d, I_{cd}), L(e, f, I_{cd}), I_{ef}).$$

For some transforms, the 12 bit output of interpolator 52 is applied to a one-dimensional output table 51 for further transforming the twelve bit processed value from interpolator 52 to the modified value $u_1'$. For example, assume that the modified value $u_1'$ is related to the input color value by the following function:

$$u_1' = SQRT\ (\log u_o' + \log v_o' + \log L_o^*)$$

where SQRT() refers to the square root of the value within the parenthesis. The input and grid tables may be loaded to compute the value: $\log u_o' + \log v_o' + \log L_o^*$. The output table is accordingly populated to effectively compute the square root of this value, thereby deriving the final modified value $u_1'$. The result is that the grid tables contain linearly varying data.

As shown in FIG. 6, the other two channels have the same architecture and operate in the same manner as described above to compute the coordinates $v_1'$, $L_1^*$.

The composition of a plurality of transform definitions into a composite transform definition is now illustrated with the following description of the composition of three transform definitions 24, 30, 15(a) into a single composite transform definition 29.

Figure 9:
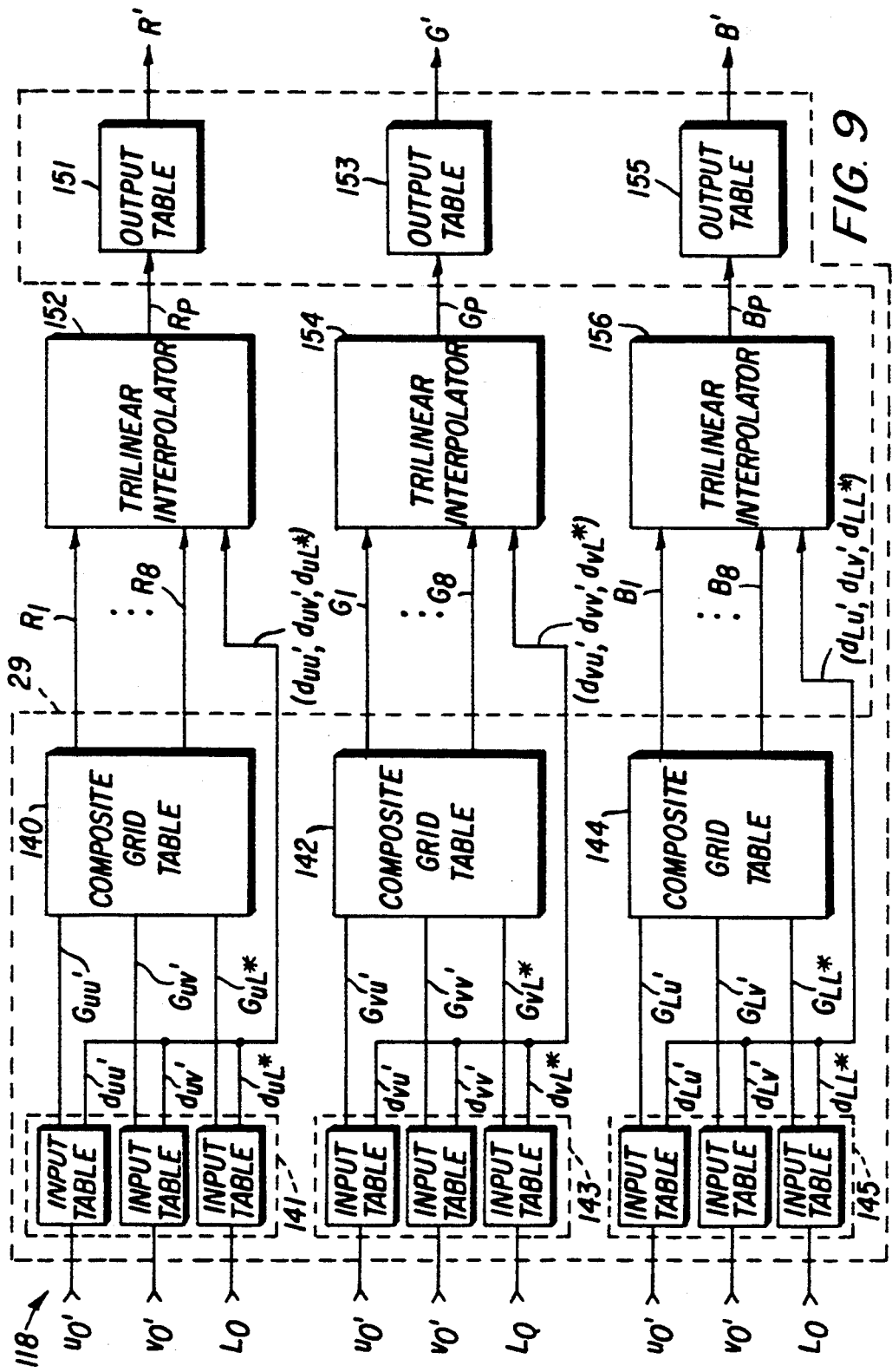
FIG. 9 is a block diagram of a composite transform definition and a processor for implementing the composite transform definition.

Referring to FIG. 9, a composite transform definition 29 has the same architecture as other-transform definitions. For example, composite transform definition 29 includes three sets of input tables 141, 143, 145, each set for indexing into a corresponding composite grid table 140, 142, 144. Definition 29 typically also includes a set of output tables 151, 153, 155 for generating an output value in response to a processed value derived from interpolating between several grid table entries.

The tables of the composite definition are designed such that, when implemented by a processor 118, they yield an input/output relation which is equivalent to (through not necessarily identical too) the successive operation of the transform definitions being composed. As will be explained more fully below, transform controller 20, successively implements each of the transform definitions 24, 30, 15(a) on a set of reference points in the color space and uses the results to determine the contents of the composite transform definition.

To simulate this successive operation, the controller first determines a sequence in which to compose the transform definitions 24, 30, 15(a). It is essential that the color values produced by the output tables of each transform definition in the sequence are in a format compatible with that expected by the input tables of the next transform definition in the sequence. Obviously, the output and input must be in the same color space (e.g., both in the u'v'L* color space). For example, the RGB output produced when implementing output calibration definition 15(a) is clearly incompatible with the u', v', L* values expected by the input tables of the gamut compression definition.

The output and inputs must also employ the same quantization for corresponding coordinates of the color space. For example, the output of the output tables of pleasing transform definition 24 and the input of the input tables of gamut compression transform definition 30 both employ the same number of bits for representing values of the coordinate u'. Further, both employ the same scale (i.e., the same range of possible u values). The number of bits in the output can of course be reduced to match a succeeding coarser quantization input. However, the input and output tables of many transform definitions employ eight bits to represent each color coordinate. Depending on the application, it may also be desireable to increase the resolution of each transform definition (e.g. from eight bits to twelve bits) for purposes of composition. This may be achieved for example, by linearly interpolating between eight bit values.

Based on the above criteria, controller 20 chooses to implement the definitions in the following sequence, pleasing definition 24, gamut compression definition 30 and output calibration definition 15(a). For purposes of illustrating the sequential implementation of the transform definitions, FIG. 8(a) depicts a set of processors 124, 130, and 115(a), each for implementing one of the transform definitions. However, as explained above, each transform definition may be implemented by a common processor which includes any combination of hardware and software. Accordingly, processors 124, 130, and 115(a) are also representative of the sequential implementation of transform definition, 24, 30 and 15(a) by a single general processor.

Figure 8C:
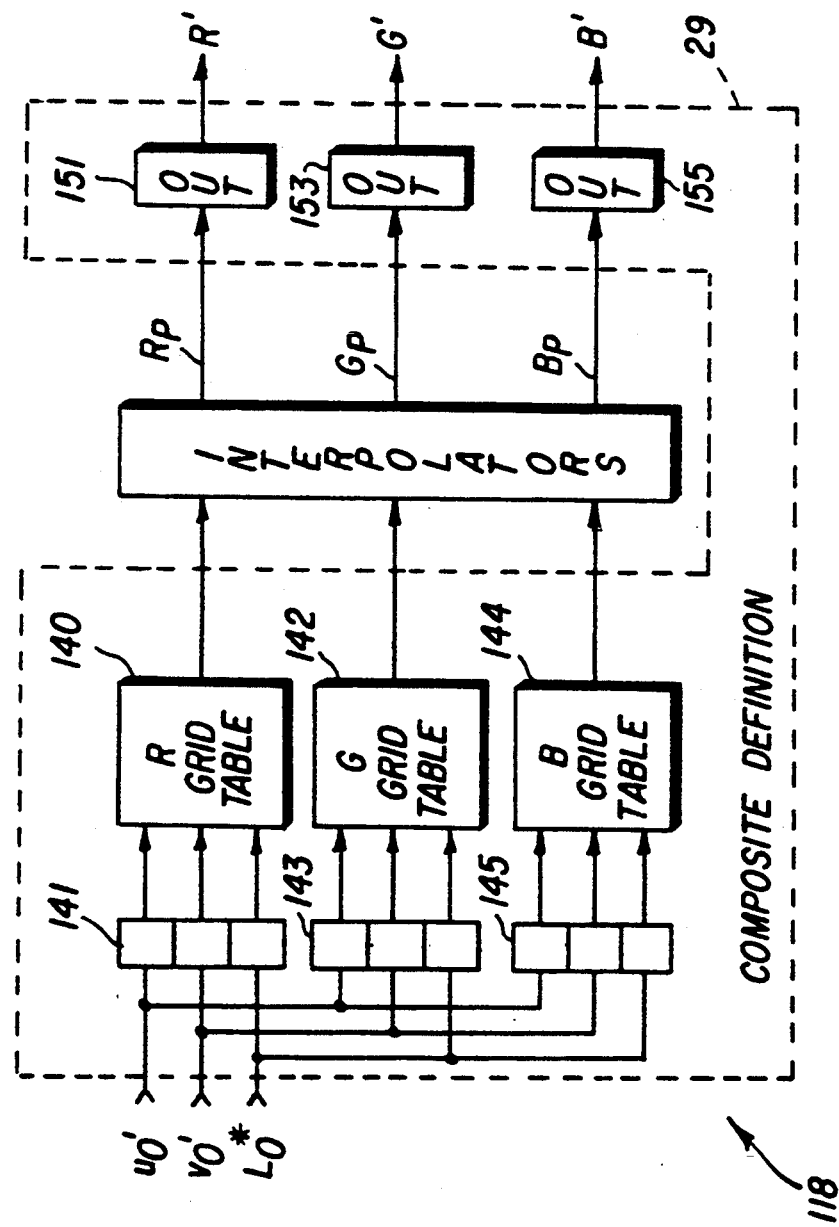
FIG. 8(c) is a diagram of a composite transform which is equivalent to the sequential implementation of the transforms illustrated in FIGS. 8(a) and 8(b).

Referring to FIGS. 8(b) and 8(c), in one embodiment, the controller 20 selects the input tables 141, 143, 145 of the first transform in the sequence (i.e., pleasing transform) as the input tables of the composite transform definition 29. Similarly, it selects the output tables 151, 153, 155 of the last transform in the sequence, (output calibration transform 115(a)) as the output tables of the composite. The contents of composite grid tables 140, 142, 144 are then computed as described below.

Figure 10:
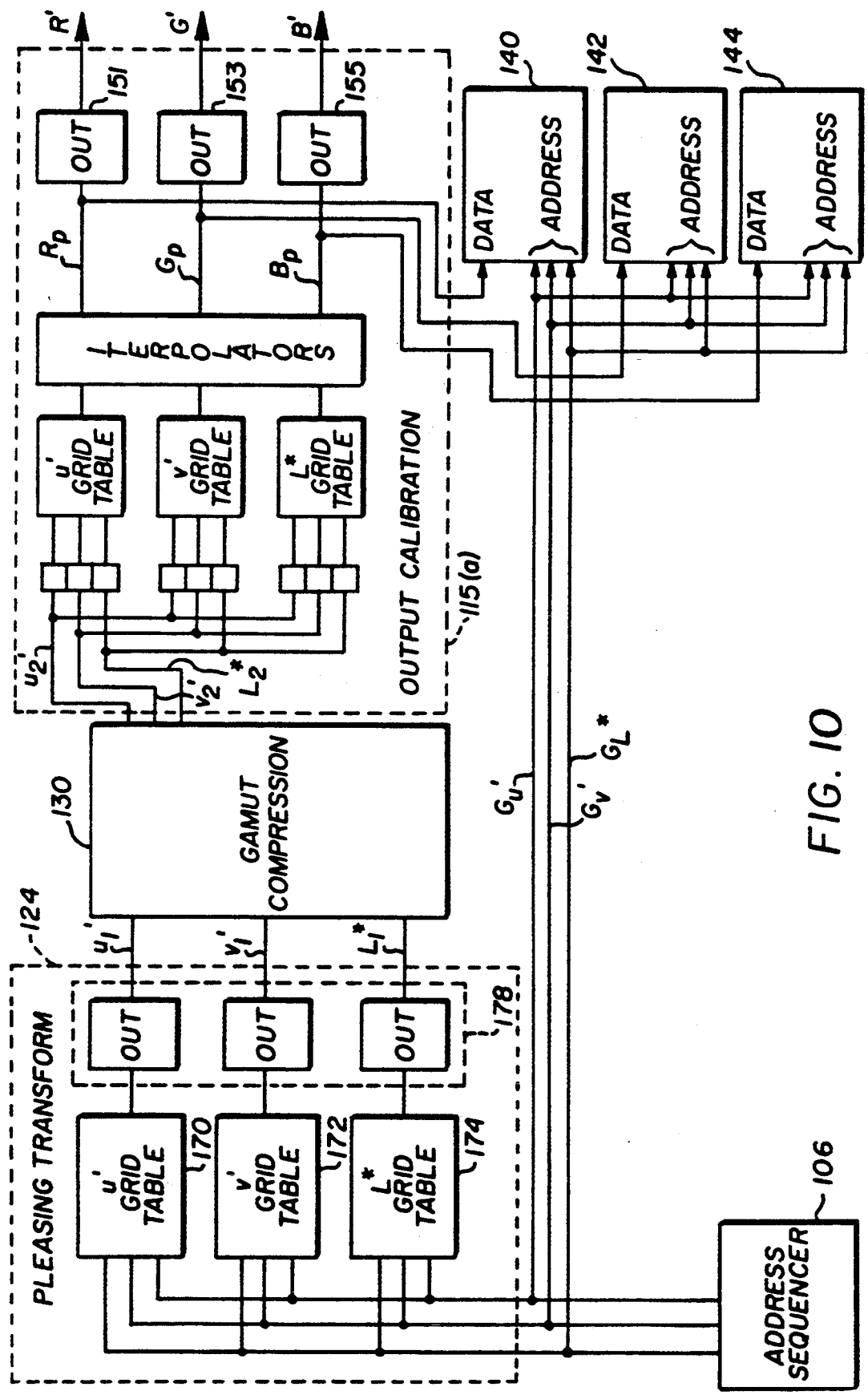
FIG. 10 is a block diagram illustrating the loading of the grid tables of the composite transform definition illustrated in FIG. 8(c).

FIG. 10 illustrates a technique for computing the contents of the composite grid tables when the input tables 141, 143, 145 of FIG. 8(c) are identical. To compute a grid table entry, an addressing unit 106 generates a three dimensional grid table address $G_u'$, $G_v'$, $G_L*$ and applies the address directly to all three grid tables 170, 172, 174 of pleasing transform 124. In response, the grid tables 170, 172, 174 each provide a corresponding entry directly to output tables 178 of the pleasing transform. (Note that no interpolation is used. Thus, the system is in effect simulating the processing of a sample color value which was precomputed for pleasing transform 124.) The resultant color value $u_1'$, $v_1'$, $L_1^*$ produced by output tables 178 is processed by gamut compression transform 130 to yield a color value $u_2'$, $v_2'$, $L_2^*$ which in turn is processed by output calibration transform 115(*a*).

The output calibration transform 115(*a*) generates a processed color value $R_p$, $G_p$, $B_p$ which, when passed through the output tables 151, 153, 155, yields the final processed value R', G', B'. Since a composite transform 29 includes the identical output tables 151, 153, 155, controller 20 stores the processed color values $R_p$, $G_p$, $B_p$ in the composite grid tables 140, 142, 144 at the same address $G_u{'}$, $G_v{'}$, $G_L{*}$ applied to grid tables 170, 172, 174. To populate the remaining locations in the composite grid tables, the address sequencer 106 repeats this process, stepping through the entire grid table address space until each location in the composite grid tables 140, 142, 144 is filled with a processed color value $R_p$, $G_p$, $B_p$.

Figure 12A:
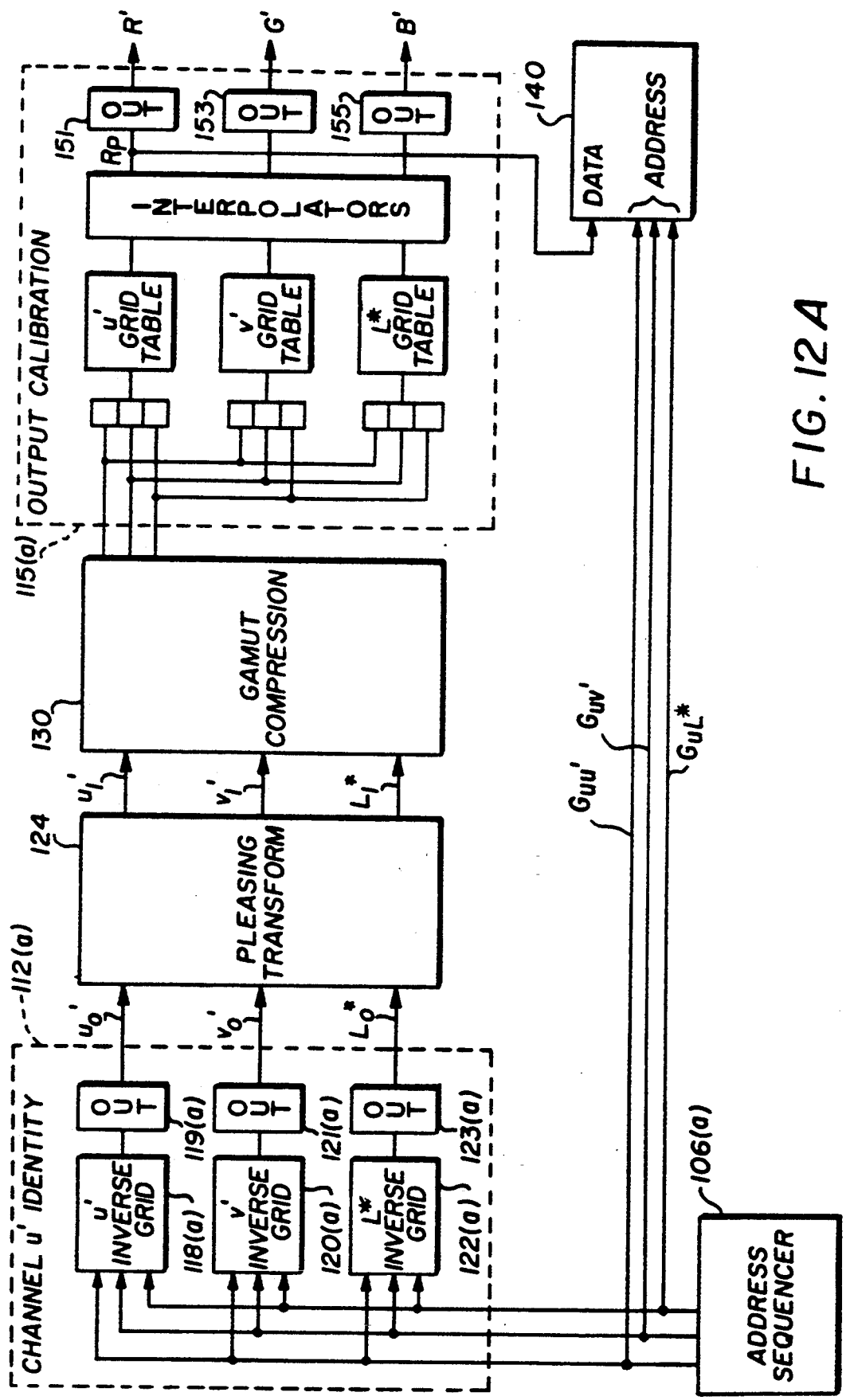
FIGS. 12(a) 12(b) and 12(c) are diagrams illustrating an alternative technique for computing sample values of a composite transform and loading the sample values into the grid tables of a composite transform definition.

Referring to FIGS. 11 and 12, a more general technique is now described for selecting input tables and populating grid tables for a composite transform 29. To understand this technique, it is useful to keep in mind that the input tables of a transform in effect define the locations in the color space for which sample values of the transform are precomputed and stored in the grid tables. Accordingly, before describing the general technique, the following first briefly describes this aspect of the input tables. Referring to FIG. 8(*c*), the processed value $R_p$ of the first channel of the composite transform is a function of the input color value $u_o{'}$, $v_o{'}$, $L_o{*}$ (i.e., $R_p = f_R(u_o{'}, v_o{'}, L_o{*})$). Grid table 140 stores sample values of the function $f_R$ taken at various points in the color space. As explained above, it is desirable to take many samples of the function in regions of the color space wherein the function is highly nonlinear. Fewer samples are needed in regions of the space were the function is linear since the values of the function in this region can accurately be estimated by linearly interpolating between neighboring samples.

Referring to FIGS. 5-7, recall that each channel in a transform definition has a set of three input tables. In response to the coordinates of a color value (e.g. point 42 in the color space) the input tables identify the grid table entry containing the sample value of the channel function (e.g. $f_R$) taken at the neighboring reference point in the color space 47($u_1$). The input tables also provide the distance values $d_u$, $d_v$, $d_L$ indicating the distance of the color value from the neighboring reference point 47($u_1$). Thus, each entry in the input tables is determined by the location in the color space of the reference points at which the channel's transform function was sampled.

Because the other channels of the composite transform may be entirely different functions of the input color value, i.e., $G_p = f_G(u_o{'}, v_o{'}, L_o{*})$ and $B_p = f_B(u_o{'}, v_o{'}, L_o{*})$, they may require, samplings at different locations in the color space than $f_R$. If so, each channel must have a unique set of input tables which reflect the desired sampling.

The reference points for a given channel of the composite should ideally be distributed throughout the color space to account for nonlinearities in the channel's transform definition. However, the linearity of each channel of the composite is generally not known at the time of composition since the characteristics of the composite vary with the user's selection of transforms to be composed. Accordingly, rather than custom selecting a set of reference points for each channel of the composite transform and generating corresponding sets of input tables, the controller typically uses the input tables of the first transform definition in the sequence as the input tables of the composite as described above (See FIGS. 8a-8c). The reference points defined by these tables are then used as the reference points for purposes of computing entries in the composite grid tables. However, if another of the transforms in the sequence is highly nonlinear (e.g., the gamut compression transform), the controller may choose the input tables of this definition for use in the composite transform definition. Otherwise, much of the information contained in the samples of the highly nonlinear transform may be lost during composition. Finally, the controller may also prepare a new set of input tables which reflect a sampling unique to the composite.

Referring to FIGS. 11 and 12, the following describes a technique for generating reference points of the color space from a selected set of input tables, and for loading processed reference points into the appropriate locations of the composite grid tables. This is accomplished by first preparing, for each channel of the composite, an identity transform definition from the selected set of input tables for that channel. An identity transform definition has the same architecture as other transform definitions, and includes the selected input tables, a set of grid tables, and optionally a set of output tables. The grid tables (and output tables if any) are designed to perform the inverse of the operation of the input tables. Accordingly, the identity transform definition, when implemented by a processor, generates the identical color value at the output as applied to the input.

FIG. 11 depicts three identity transform definitions 112(*a*), 112(*b*), 112(*c*), each corresponding to one channel of the composite. The input tables 141 of the identity transform definition 112(*a*) are identical to the input tables chosen for the u channel of the composite. The inverse grid tables 118(*a*), 120(*a*), 122(*b*) and the inverse output tables 119(*a*), 121(*a*), 123(*a*) (optional) are populated to collectively perform the inverse of the input tables 141. Accordingly, in response to a given input value u', v', L*, the processor 110 (which implements these definitions) provides the same coordinates u', v', L*. As shown in FIGS. 11(*b*) and 11(*c*), similar identity transforms are generated for the v' and L* channels using the input tables 143 and 145 respectively. As described below, the reference points corresponding to each channel's input tables can now be readily generated from the inverse grid tables and the inverse output tables of the channel's identity transform 112(*a*), 112(*b*), 112(*c*).

Referring to FIG. 12(*a*), to generate a first reference point $u_0{'}$, $v_0{'}$, $L_0{*}$ of the u channel, an addressing unit 106(*a*) generates a grid table address $G_{uu'}$, $G_{uv'}$, $G_{uL*}$, thereby selecting the first entry in each of the inverse grid tables 118(*a*), 120(*a*), 122(*a*). The grid table entries are provided directly to the corresponding inverse output tables 119(*a*), 121(*a*), 123(*a*). The output tables respond by providing the sample color value (i.e., reference point) $u'_0$, $v'_0$, $L*_0$. This color value is sequentially processed by the three transforms 124, 130 and 115(*a*). The value $R_p$ generated by the u channel of the output calibration processor 115(*a*) is stored in grid table 140 at the address $G_{uu'}$, $G_{uv'}$, $G_{uL*}$.

To populate the grid table 140, addressing unit 106 simply steps through each combination of grid table addresses ($G_{uu'}$, $G_{uv'}$, $G_{uL*}$). Accordingly, the grid table is loaded with sample values of an input/output relation of the u channel which (coupled with the relation provided by the output tables 151) is equivalent to (though not necessarily identical to) the successive operation of the transform definitions being composed.

Figure 12B:
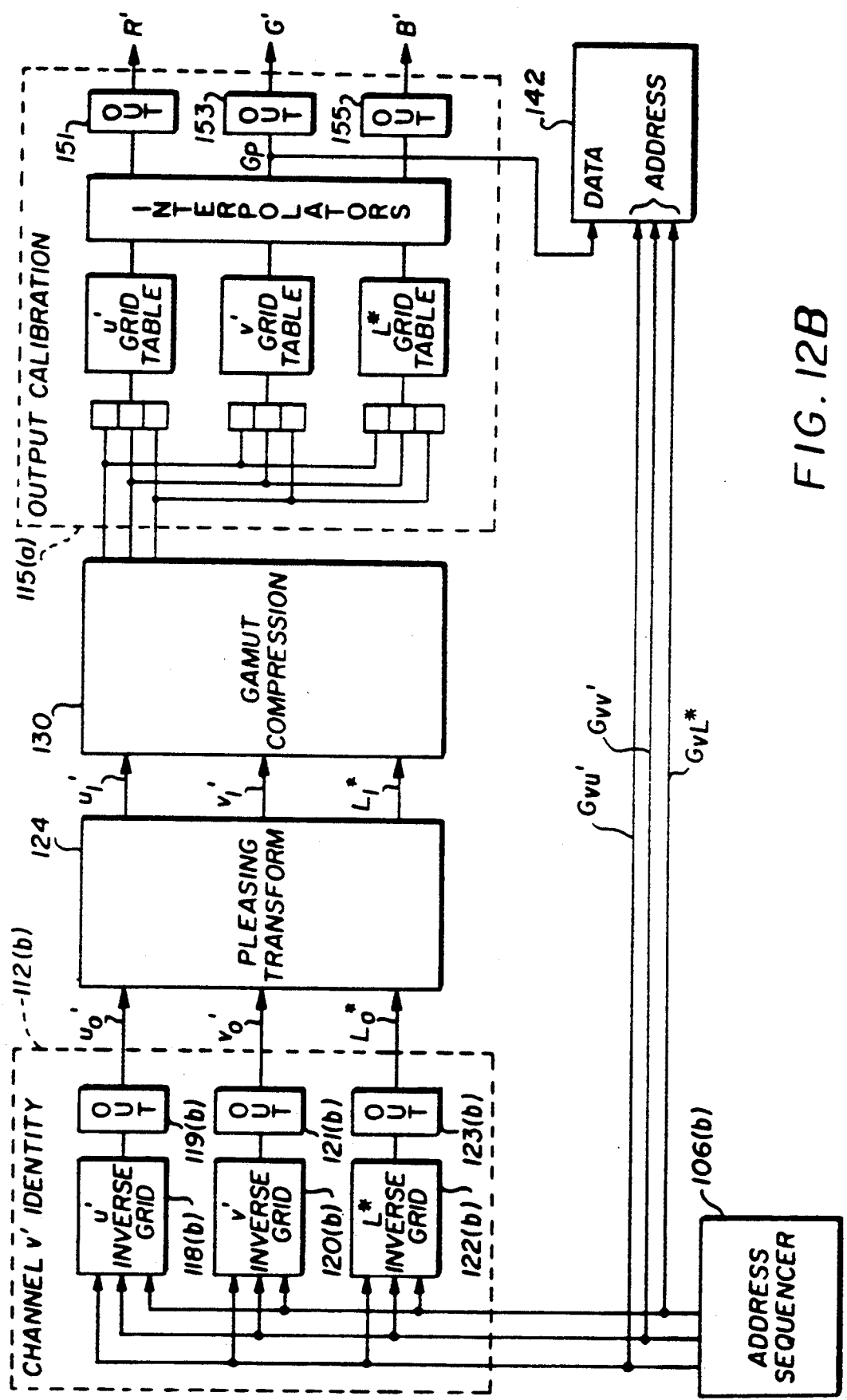
Figure 12C:
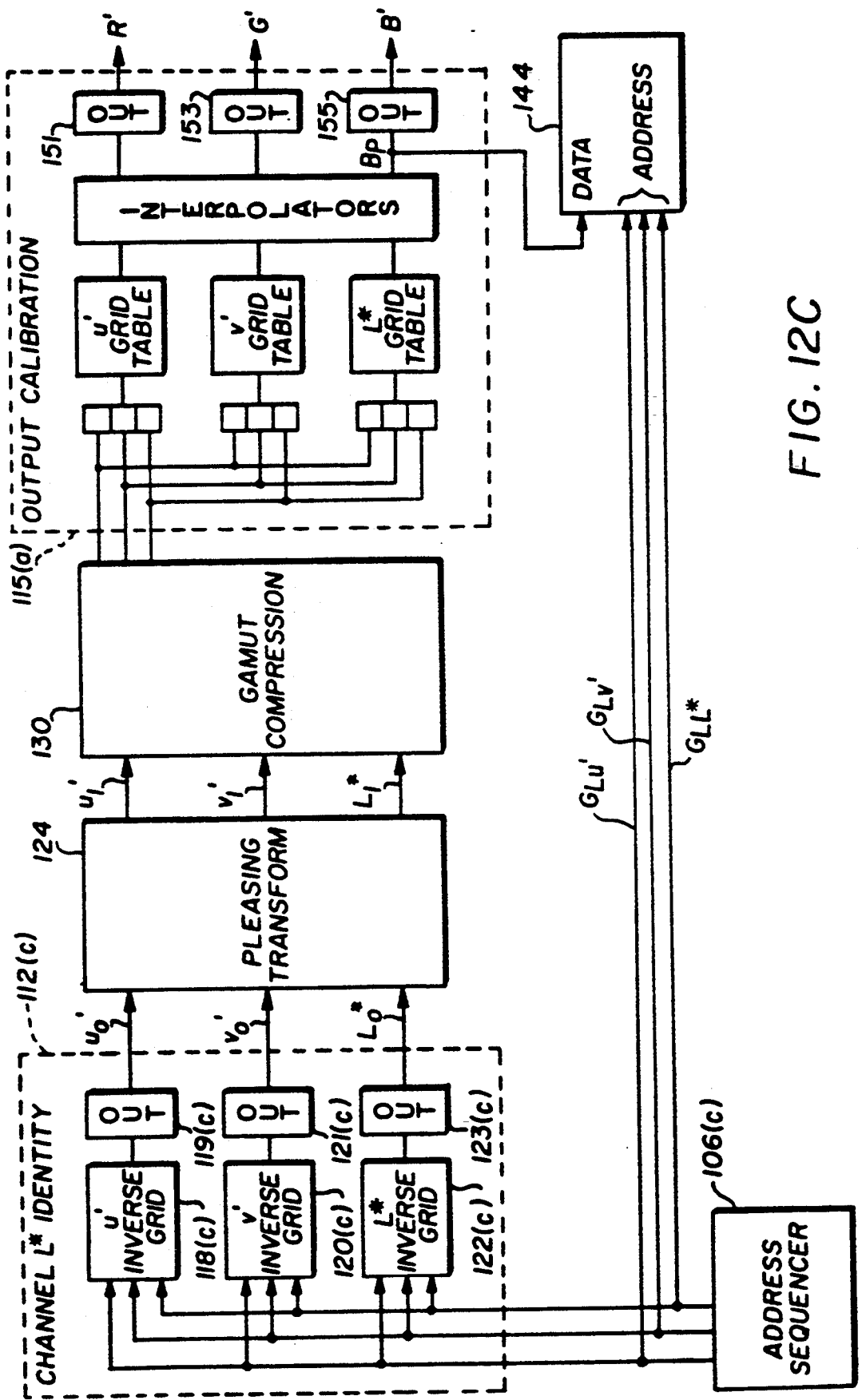

Referring to FIGS. 12(b) and 12(c), the same technique described above is used to populate the grid tables 142, 144 of the remaining channels of the composite transform. More specifically, using the inverse grid tables and inverse output tables from the identity transforms 112(b), 112(c), address unit 106 walks through each grid table address space in the same manner described above to fully populate the new composite grid tables 142, 144.

Figure 13:
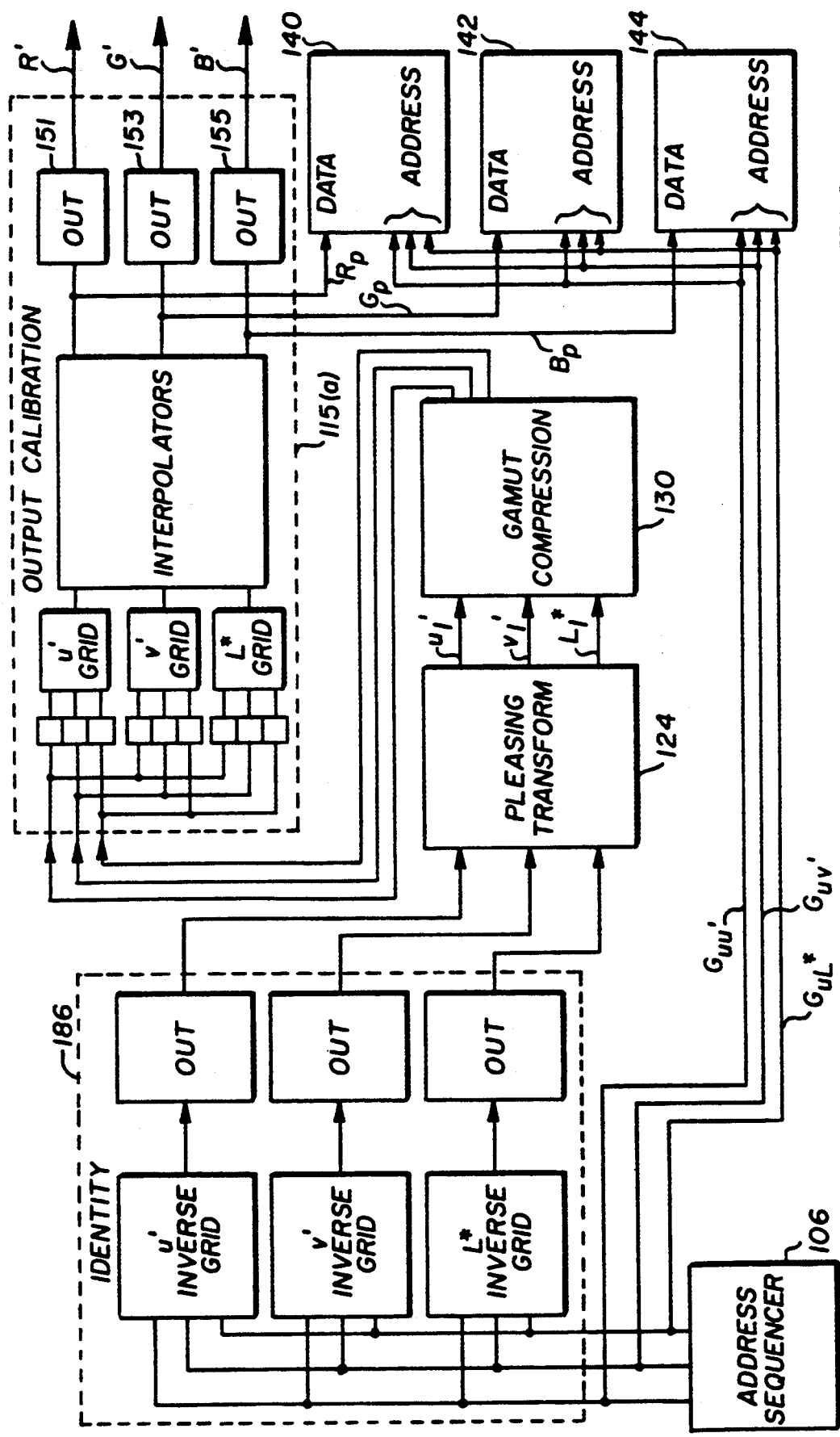
FIG. 13 is a diagram illustrating a technique for simultaneously loading the grid tables of all channels of a composite transform definition.

It should be noted that independently populating each grid table 140, 142, 144 in the above described manner can expend large amounts of the controller's time. Accordingly, it is often desirable to select input tables 141, 143, 145 which are identical across all channels. In this situation, a single identity transform is prepared for all three channels using the set of input tables common to all channels. As shown in FIG. 13, all three grid tables 140, 142, 144 can then be loaded using the inverse grid tables and inverse output tables of the same identity transform 186.

Figure 14:
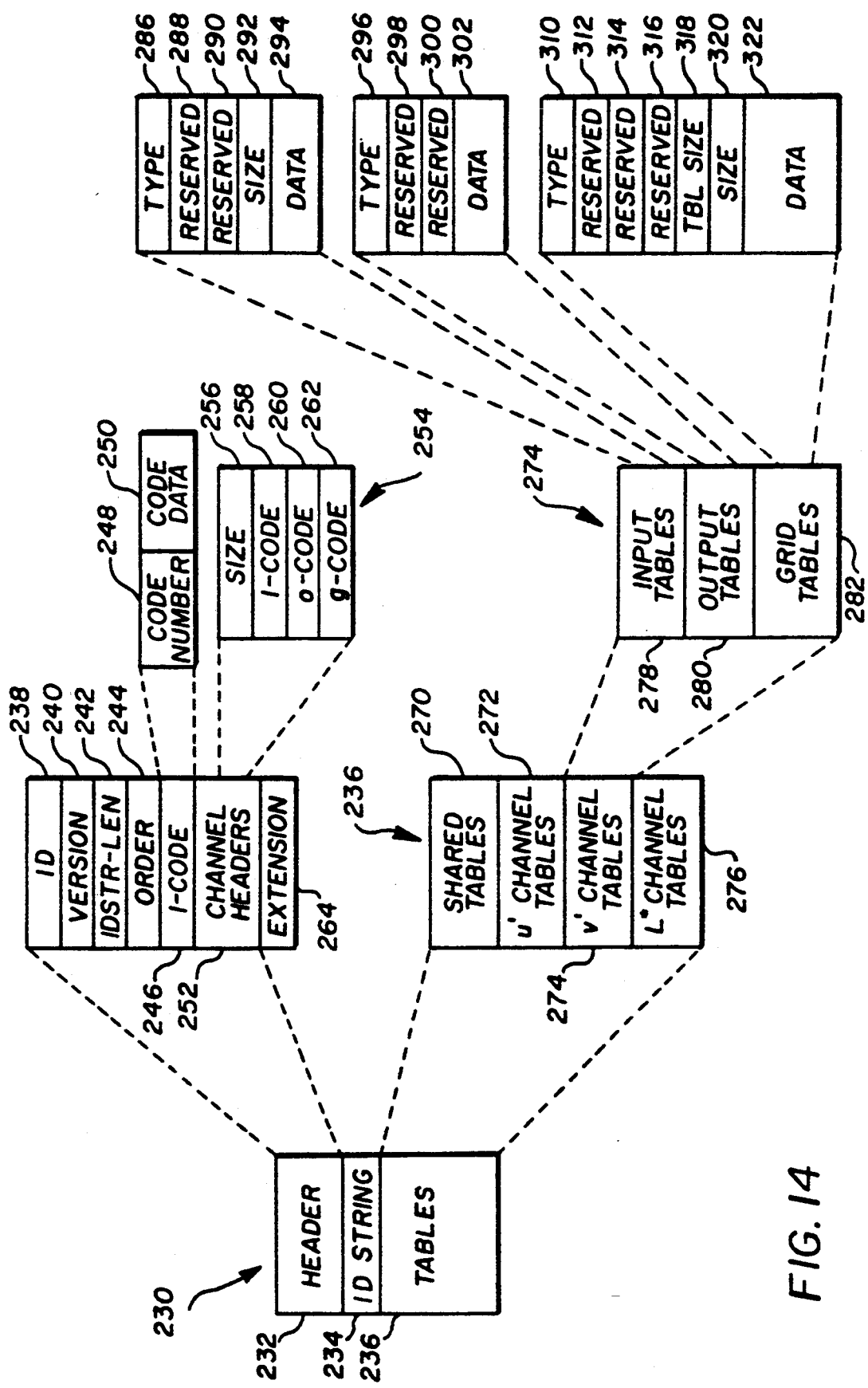
FIG. 14 is a diagram of a format for communicating a transform definition.

Referring to FIG. 14, in accordance with the invention, a transform definition 230 is communicated to a processor for implementation (or to any other destination device such as a remote device across a communication network) using a standard protocol or format. According to this standard communication protocol, each transform definition includes three sections, a header 232, an optional id string 234, and a table field 236 containing the input, output and grid tables.

The header 232, in the illustrated embodiment, is five hundred bytes long and begins with a four byte identification field 238 for storing a number which identifies the format as that of a transform definition file. Identification field 238 is followed by a four byte version field 240 for storing a version number which distinguishes the current file from earlier versions. A four byte Idstr-length field 242 follows the version field 240 and is used to specify the length of the optional Id string 234.

Next, a four byte order field 244 specifies the default approximation method to be used when evaluating the transform definition (e.g., the nearest neighbor technique, linear interpolation, or cubic interpolation). An I-code field 246 contains a four byte code word for each common input table of the transform definition (i.e., an input table which is used by more than one of the transform definition's channels). The code word 246 contains two sub-fields, a code number field 248 and a code data field 250. The code number field 248 identifies the type of the associated input table. For example, in this illustrated embodiment, a 00 Hex in the code number field indicates that the input table is null and is therefore not defined in the file. The code number 01 Hex indicates that the input table is also used by other transform definitions and therefore is contained in a common list of shared input tables 270 stored in table field 236. An address, identifying this common list and the specific entry containing the shared input table, is specified in the code data field 250. The code number 02 Hex indicates that the input table is a simple, linear ramp function which maps the input values into a grid size specified in the code-data field 250. Accordingly, the input table is not stored in the file since it can be readily constructed when needed. Finally, the code number 04 Hex indicates that the input table is unique and therefore is stored in field 236 of file 230.

An array 252 of channel headers follows the common input table codes 246. Array 252 includes a 56 byte header 254 for each output channel of the transform definition. Each header 254 begins with an array of two byte "size" fields 256. Each entry of the array specifies the size of a corresponding channel's grid table in one of the grid tables' dimensions. For example, an entry of 00 Hex or 01 Hex in one element of the array indicates that the grid table does not use the dimension corresponding to the entry.

Size field 256 is followed by an I-code field 258 which contains a four byte code for each of the channel's private input tables (i.e., input tables not used by other channels of the transform definition). Each four byte code identifies the type of input table using the same codes used in I-code field 246. In the same manner, o-code field 260 and g-code field 262 identify the type of output table and grid table associated with the channel (e.g., null, linear ramp, or unique).

Finally, an extension field 264 follows the channel headers 52, to provide a mechanism for expanding the header information while allowing forward and backward compatibility.

The optional Id string field 234 may be used for storing ASCII text for identifying a particular transform or describing other application specific attributes that the transform may have. In this case, the Idstr-length field 242 of header 232 is filled with a number representing the length of the desired optional Id string field 234.

The table field 236 contains the data of each of the input, output and grid tables stored in the file. The input, grid and output tables which are shared by more than one channel (the shared tables 270) are listed first. The shared tables 270 are then followed by the private tables unique to each channel. For example, the table depicted in FIG. 12 has three sets of private tables 272, 274, 276, each set containing the private tables corresponding to one of the three channels, u', v', and L*.

Within a given set of private tables, the input tables 278 are listed first, followed by the output tables 280 and the grid tables 282.

Each input table contains a four byte type field 286 containing a number identifying the format of the input table. The type field is followed by a four byte reference field 288 and a four byte Id field 290. These fields are reserved for use when the definition is loaded into physical memory. A size field 292 specifies the size of the grid table dimension into which the input table indexes. For example, the size field of input table 60 (FIG. 6) indicates that the input table indexes the variable u' into a five bit grid dimension Gu. Finally, the above header information (286–292) is followed by the data field 294 containing the two hundred and fifty-seven entries of the input table. In the present embodiment, each entry is thirty-two bits wide, the high order bits containing a grid table address (e.g., Gu) the lower sixteen bits containing a distance values (e.g, du).

Each output table contains a type field 296, a reference field 298 and an Id field 300 containing the same type of header information as fields 286, 288 and 290 of the input table. These header fields are followed by four thousand and ninety-six (4096) output table entries 302. Each entry is sixteen bits wide. However, in the present embodiment, only the lower twelve bits are used.

Finally, each grid table contains header fields 310, 312, 314 containing the same type of information as type field 286, reference field 288, and Id field 290 described above with respect to the input tables. The header of the grid tables further include a table field 316, a table size field 318 and a size field 320.

Table field 316 is reserved for future use. The table size field 318 specifies the number of bytes in the grid table (two bytes per entry in the illustrated embodiment). This field is followed by the table size field 320 which contains an array of two byte entries, each entry specifying the size of the grid table in each of its dimensions. This size information should match the size information in each of the size fields 292 of each of the input tables which index the grid table.

Finally, the above header information is followed by the data field 322 containing the sixteen bit grid table entries. In the present embodiment, however, only twelve of the bits are used.

Additions, subtractions, deletions and other modifications of the preferred particular embodiments of the invention will be apparent to those practiced in the art and are within the scope of the following claims.

What is claimed is:

1. An electronic system for generating a modified image from an original image comprising:
    a plurality of input devices, each for providing electronic color pixel representations of original images;
    a storage device for storing a plurality of color transform definitions, each transform definition representing an input/output relation for color values;
    a user interface manipulable by a user to select multiple transform definitions;
    a transform composer for composing the user-selected multiple transform definitions into a composite transform definition, said composite transform definition being equivalent to the sequential application of the multiple transform definitions; and
    an image processor transforming the colors of the electronic color pixel representation of the original image through a single application of the composite transform definition, thereby generating a modified image.

2. The system of claim 1 wherein the storage device stores each transform definitions in the form of:
    an input table containing an entry for each of a plurality of sample color values, each input table entry comprising an address for a grid table;
    a grid table containing an entry for each of a plurality of grid table addresses, each grid table entry comprising an address for an output table; and
    an output table containing an entry for each of a plurality of output table addresses, each output table entry comprising a modified color value.

3. The system of claim 2 wherein the image processor:
    uses an image pixel color value and a composite transform input table to retrieve a grid table address;
    uses the grid table address and a composite transform grid table to retrieve a composite transform definition output table address; and
    uses the output table address and a composite transform output table to retrieve a modified color value for the image pixel color value.

4. The system of claim 3 wherein the image processor further includes means for interpolating among grid table entries.

5. The system of claim 1 wherein the transform composer comprises:
    means for transforming sample color values into modified color values in response to a first user-selected transform definition;
    means for transforming modified color values into further modified color values in response to a second user-selected transform definition; and
    means for generating a composite transform definition from the further modified color values.

6. The system of claim 1 wherein the storage device stores each transform definition as an input table, a grid table and an output table, each entry in said input table relating a sample color value to a grid table address, each grid table entry relating a grid table address to an output table address, each output table entry relating an output table address to an output color value, and the transform composer comprises:
    means for copying an input table of a first user selected transform as an input table of the composite transform; means for copying an output table of a last user selected transform as an output table of the composite transform;
    means for sequentially transforming sample color values using the user selected transforms, and
    means for using the transformed sample color values to construct a grid table for the composite transform.

7. The system of claim 6 wherein the transform processor further comprises means for interpolating among table entries.

8. The system of claim 1 wherein the user interface further includes means for modifying a user-selected transform.

9. The system of claim 1 further comprising means for composing an identity transform with another transform.

10. The system of claim 1 wherein at least one user selected transform definition comprises an input device calibration definition derived from color characteristics of an input device.

11. The system of claim 10 wherein the input device calibration definition comprises at least one look-up table.

12. A method for generating a modified image from an original image comprising steps of:
    storing a plurality of color transform definitions in an electronic image processing apparatus, each transform definition representing an input/output relation for color values;
    generating an electronic color pixel representation of an original image;
    receiving a user's selection of multiple transform definitions;
    composing the user-selected multiple transform definitions into a composite transform definition, said composite transform definition being equivalent to a sequential application of the multiple transform definitions; and
    transforming the colors of the electronic color pixel representation of the original image by a single application of the composite transform definition, thereby generating a modified image.

13. The method of claim 12 wherein each transform definition comprises:
    an input table containing an entry for each of a plurality of sample color values, each input table entry comprising an address for a grid table;

a grid table containing an entry for each of a plurality of grid table addresses, each grid table entry comprising an address for an output table; and an output table containing an entry for each of a plurality of output table addresses, each output table entry comprising a modified color value.

14. The method of claim 13 wherein the step of transforming colors of the electronic image includes steps of:

using a composite transform input table to select a composite transform grid table address for an image pixel;

using a composite transform grid table to select a composite transform output address for the image pixel; and using a composite transform output table to select a modified color value for the image pixel.

15. The method of claim 14 wherein the step of transforming colors of the electronic image further includes a step of interpolating among grid table entries.

16. The method of claim 12 wherein the composing step comprises steps of:

transforming sample color values into modified sample color values using a first user selected transform definition, said sample color values taken at intervals throughout a range of colors;

sequentially transforming modified sample color values into further modified sample color values using a second user selected transform definition; and using the further modified sample color values to construct a composite transform definition.

17. The method of claim 12 wherein each transform definition comprises an input table, a grid table and an output table, each entry in said input table relating a sample color value to a grid table address, each grid table entry relating a grid table address to an output table address, each output table entry relating an output table address to an output color value and the composing step comprises steps of:

copying an input table of a first user selected transform as an input table of the composite transform;

copying an output table of a last user selected transform as an output table of the composite transform;

sequentially transforming sample color values using the user selected transforms, and using the transformed sample color values to construct a grid table of the composite transform.

18. The method of claim 17 wherein the steps of transforming sample color values include steps of interpolating among grid table entries.

19. The method of claim 12 wherein the composing step includes a step of inserting an additional transform in a series so that output values of each transform are in the same color notation as required for input to a subsequent transform in the series.

20. The method of claim 12 further including a step of allowing a user to modify a selected transform.

21. The method of claim 12 further comprising a step of:

composing the identity transform with another transform.

22. The method of claim 12 wherein at least one user selected transform definition comprises an input device calibration definition derived from color characteristics of an input device.

23. The method of claim 22 wherein the input device calibration definition comprises at least one look-up table.

24. A color-calibrated electronic image processing system comprising:

an input device providing an electronic color pixel representation of an original image;

a storage device storing: 1) an input device calibration definition derived from color characteristics of the input device, and 2) a plurality of color transform definitions;

a user interface manipulable by a user to select a color transform definition;

a transform composer for generating a composite transform definition equivalent to a sequential application of the input device calibration definition and the user-selected transform definition; and an image processor using the composite transform definition to transform the color pixel representation into a modified image.

25. A color-calibrated electronic image processing system comprising:

an input device providing an electronic color pixel representation of an original image;

an output device providing a printed image from a pixel representation of an image;

a storage device storing: 1) an input device calibration definition derived from color characteristics of the input device, 2) an output device calibration definition derived from color characteristics of the output device, and 3) a plurality of color transform definitions;

a user interface manipulable by a user to select a color transform definition;

a transform composer for generating a composite transform definition equivalent to a sequential application of the input device calibration definition, the user-selected transform definition and the output device calibration definition; and an image processor using the composite transform definition to transform the color pixel representation into a modified image.

26. The system of claim 25 wherein the storage device stores calibration definitions and transform definitions in the form of:

an input table containing an entry or each of a plurality of sample color values, each input table entry comprising an address for a grid table;

a grid table containing an entry for each of a plurality of grid table addresses, each grid table entry comprising an address for an output table; and an output table containing an entry for each of a plurality of output table addresses, each output table entry comprising a modified color value.

27. The system of claim 25 wherein the image processor:

uses an image pixel color value and a composite transform input table to retrieve a grid table address;

uses the grid table address and a composite transform grid table to retrieve a composite transform definition output table address; and uses the output table address and a composite transform output table to retrieve a modified color value for the image pixel color value.

28. The system of claim 27 wherein the image processor further includes means for interpolating among table entries.

29. The system of claim 25 wherein the transform composer comprises:

means for transforming sample color values into modified color values using the input calibration definition;

means for transforming modified color value into further modified color values using the user-selected transform definition; and means for generating a composite transform definition from the further modified color values.

30. The method of claim 25 wherein the user interface further includes means for modifying a user-selected transform.

31. The system of claim 25 wherein at least one user selected transform definition comprises an input device calibration definition derived from color characteristics of an input device.

32. The system of claim 31 wherein the input device calibration definition comprises at least one look-up table.

33. An electronic system for generating a modified image from an original image comprising:

a plurality of input devices, each for providing electronic color pixel representations of original images;

a plurality of output devices, each for providing a printed image from an electronic representation of an image;

a storage device for storing a plurality of color transform definitions, each transform definition representing an input/output relation for color values;

a user interface manipulable by a user to select multiple transform definitions;

a transform composer for composing the user-selected multiple transform definitions into a composite transform definition, said composite transform definition being equivalent to the sequential application of the multiple transform definitions; and an image processor transforming the colors of the electronic color pixel representation of the original image through a single application of the composite transform definition, thereby generating a modified image.

34. An electronic, color transform processing apparatus comprising:

a storage device storing: 1) an input device calibration definition derived from color characteristics of an input device, said input device providing an electronic color pixel representation of a non-electronic image, 2) an output device calibration definition derived from color characteristics of an output device, said output device providing a printed image from a pixel representation of an image, and 3) at least one color transform definition;

a user interface manipulable by a user to select a plurality of stored definitions;

a transform composer for generating a composite transform definition equivalent to a sequential application of the user selected definitions.

35. The apparatus of claim 34 further comprising means for composing an identity transform with another transform.

36. The apparatus of claim 34 wherein the storage device stores calibration definitions and transform definitions in the form of:

an input table containing an entry for each of a plurality of sample color values, each input table entry comprising an address for a grid table;

a grid table containing an entry for each of a plurality of grid table addresses, each grid table entry comprising an address for an output table; and an output table containing an entry for each of a plurality of output table addresses, each output table entry comprising a modified color value.

37. The apparatus of claim 34 wherein the storage device stores each transform definition as an input table, a grid table and an output table, each entry in said input table relating a sample color value to a grid table address, each grid table entry relating a grid table address to an output table address, each output table entry relating an output table address to an output color value, and the transform composer comprises:

means for copying an input table of a first user selected transform as an input table of the composite transform;

means for copying an output table of a last user selected transform as an output table of the composite transform;

means for sequentially transforming sample color values using the user selected transforms, and means for using the transformed sample color values to construct a grid table for the composite transform.

38. The apparatus of claim 34 wherein the transform composer further includes means for interpolating among table entries.

39. The apparatus of claim 34 wherein the transform composer comprises:

means for transforming sample color values into modified color values using the input calibration definition;

means for transforming modified color value into further modified color values using the user-selected transform definition; and means for generating a composite transform definition from the further modified color values.

40. The apparatus of claim 34 wherein the user interface further includes means for modifying a user-selected transform.

41. The apparatus of claim 34 wherein at least one user selected transform definition comprises an input device calibration definition derived from color characteristics of an input device.

42. The apparatus of claim 41 wherein the input device calibration definition comprises at least one look-up table.

* * * * *